United States Patent [19]
Post et al.

[11] Patent Number: 5,374,881
[45] Date of Patent: Dec. 20, 1994

[54] ELECTRIC MOTOR CONTROLLER

[75] Inventors: Stephen F. Post, Walnut Creek; Warren J. Vinzant, Castro Valley; Scott A. Bowman, Fairfax; George L. Ackerson, Alamo, all of Calif.

[73] Assignee: Curtis Instruments, Inc., Mount Kisco, N.Y.

[21] Appl. No.: 981,164

[22] Filed: Nov. 24, 1992

[51] Int. Cl.$^5$ ............................................. H02P 3/10
[52] U.S. Cl. ................................... 318/373; 318/380
[58] Field of Search ............... 318/139, 373, 374, 375, 318/379, 380, 599; 388/804, 811, 819, 829, 831, 907, 907.5

[56] References Cited

U.S. PATENT DOCUMENTS

| | | | |
|---|---|---|---|
| 3,854,076 | 12/1974 | Lambert | 318/375 X |
| 3,958,163 | 5/1976 | Clark | 318/373 |
| 4,032,825 | 6/1977 | Klimo | 318/139 |
| 4,068,153 | 1/1978 | Artrip et al. | 318/373 |
| 4,069,445 | 1/1978 | Klimo | 318/139 |
| 4,401,926 | 8/1983 | Morton et al. | 318/376 |
| 4,518,902 | 5/1985 | Melocik et al. | 318/373 |
| 4,529,919 | 7/1985 | Melocik et al. | 318/373 |
| 4,626,750 | 12/1986 | Post | 318/139 |
| 4,804,893 | 2/1989 | Melocik | 318/373 X |

OTHER PUBLICATIONS

Zapi Italian Product Specification Data Sheet for "Cheap Console", 2 pgs.
Zapi Italian Product Specification Data Sheet for "High Frequency MOSFET Controller With Microprocessor Logic HI", 2 pgs.
Sevcon Tech/Ops Product Bulletin, 19 pgs.
GE Electric Vehicle Systems, Instruction Manual for EV100 LX/LXT SCR Controls, 42 pgs.

Primary Examiner—Bentsu Ro
Attorney, Agent, or Firm—Skjerven, Morrill, Macpherson, Franklin & Friel

[57] ABSTRACT

A motor controller comprises a plug detect circuit which detects "continuous" plug diode conduction during plug braking. The plug detect circuit detects "continuous" plug braking by detecting when a plug diode is or is not conducting current throughout substantially the entire time that a power MOSFET controlling the plug braking is conductive in one pulse width modulated MOSFET switching cycle. Continuous plug detection facilitates the motor controller's controlling a vehicle so that the vehicle has a more constant and smooth plug braking deceleration and subsequent powered acceleration in the opposite direction. According to another aspect of the invention, a motor controller comprises a POT HI and a POT LO driver circuit. The POT HI and POT LO driver circuits allow the detection of faults in throttle devices and the connections of the throttle devices to the POT HI and POT LO driver circuits. One of the POT HI and POT LO driver circuits has a greater current limit than does the other driver circuit so that numerous faults including open circuit breaks in the connection of a throttle device as well as shorts across or through the throttle device are detectable by the motor controller.

14 Claims, 38 Drawing Sheets

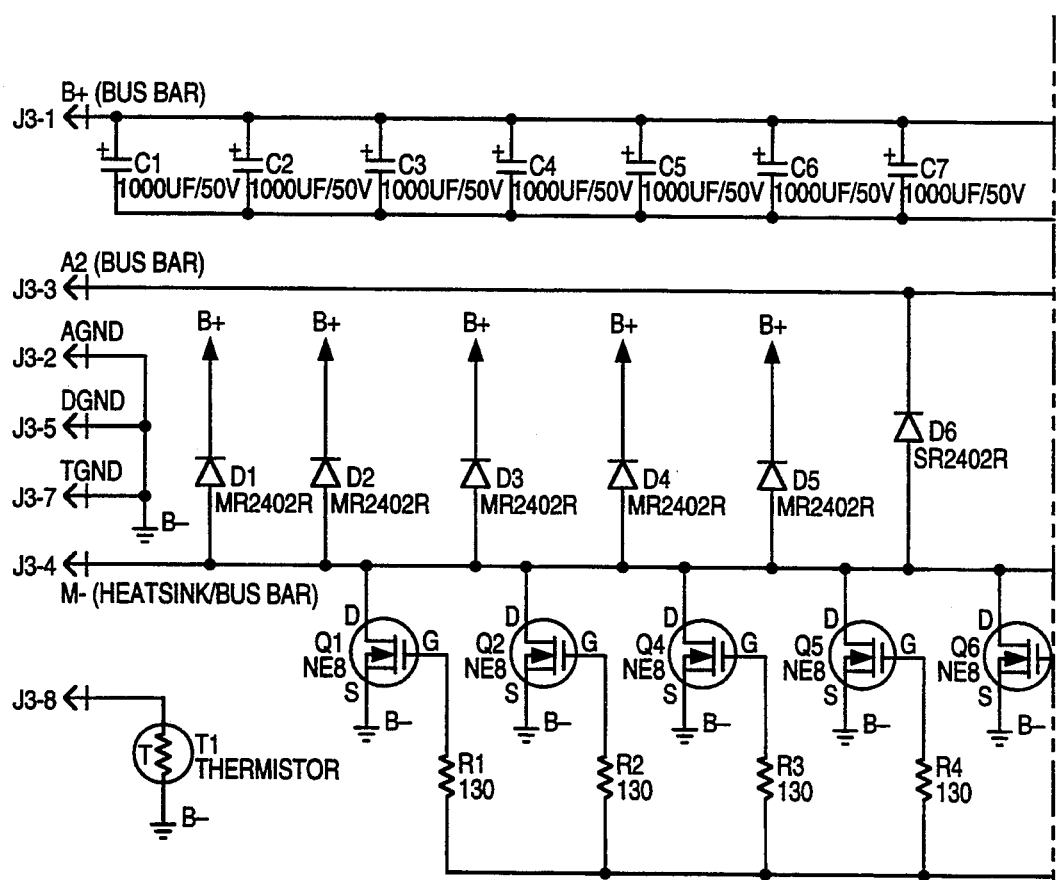
FIG. 3A(1)
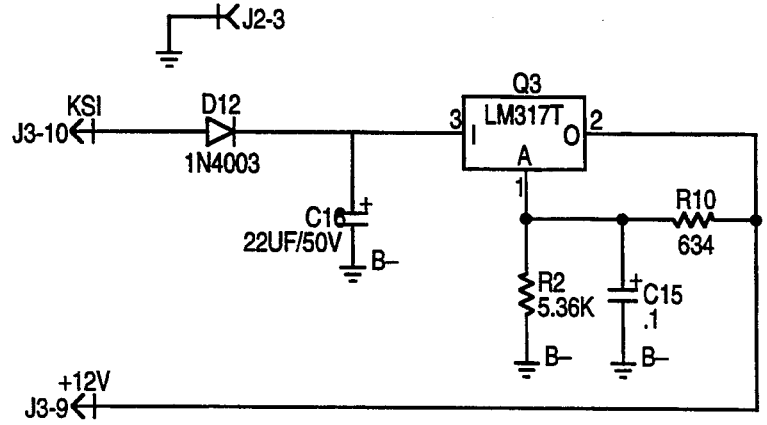
FIG. 3B

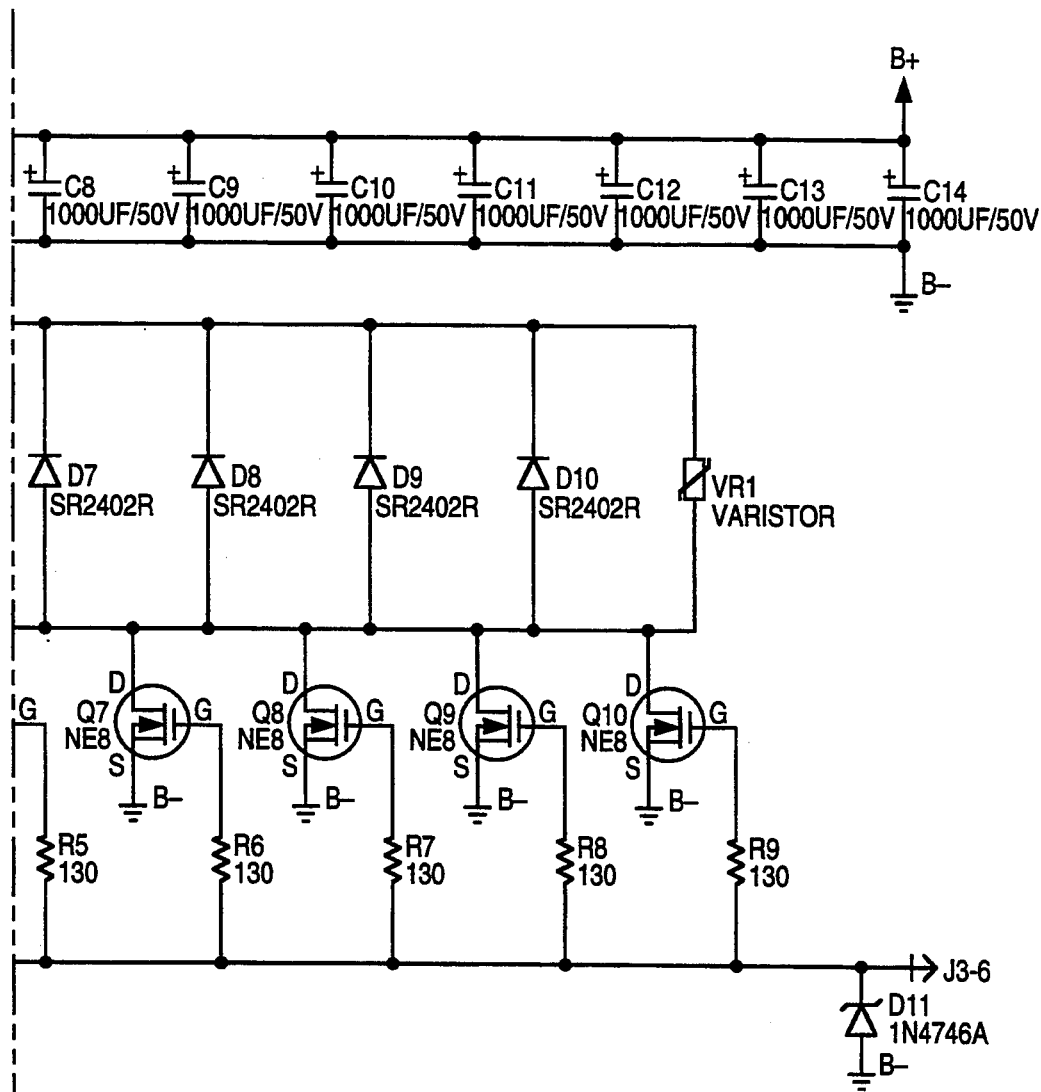
FIG. 3A(2)

| FIG. 4A | FIG. 4B | FIG. 4C | FIG. 4D | FIG. 4E |
|---------|---------|---------|---------|---------|
| FIG. 4F | FIG. 4G | FIG. 4H | FIG. 4I | FIG. 4J |

FIG. 4

CONTROL CONNECTOR
TERMINAL FEATURES:

POT HI:
5V, 20mA
current limited feed 5K-0:
5k-0 and 0-5k sense
input and power feed WIPER:
Voltage and Current
throttle input sense POT LO:
Current lim. (20mA) ground
feed (regulated at 0.2V)

OPERATIONAL STATE DIAGRAM

OPERATE MODE STATE DIAGRAM

MAIN PROCESSING FLOW

MAIN PROCESSING FLOW

MAIN PROCESSING FLOW

MAIN PROCESSING FLOW

MAIN PROCESSING FLOW

RAMPCHECK PROCESS FLOW

ELECTRIC MOTOR CONTROLLER

FIELD OF THE INVENTION

This invention relates to electric motor control systems. More particularly, this invention relates to a motor controller for controlling a D.C. motor of an electric vehicle.

SUMMARY OF THE INVENTION

According to one aspect of the invention, a motor controller comprises a plug detect circuit which detects "continuous" plug diode conduction during plug braking. The plug detect circuit detects "continuous" plug braking by detecting when a plug diode is or is not conducting current throughout substantially the entire time that a power MOSFET controlling the plug braking is conductive in one pulse width modulated MOSFET switching cycle. Continuous plug detection facilitates the motor controller controlling a vehicle to control the vehicle to have a more constant and smooth plug braking deceleration and subsequent powered acceleration in the opposite direction.

According to another aspect of the invention, a motor controller comprises POT HI and POT LO driver circuits. The POT HI and POT LO driver circuits allow the detection of faults in throttle devices and the connections of the throttle devices to the POT HI and POT LO driver circuits. One of the POT HI and POT LO driver circuits has a greater current limit than does the other driver circuit so that faults including open circuit breaks in the connection of a throttle device as well as shorts across or through the throttle device are detectable.

BRIEF DESCRIPTION OF THE DRAWINGS

FIG. 3A-3B is a circuit schematic of the power circuit section of the motor controller of FIG. 1 in accordance with the present invention.

DETAILED DESCRIPTION OF THE PREFERRED EMBODIMENTS

Figure 1:
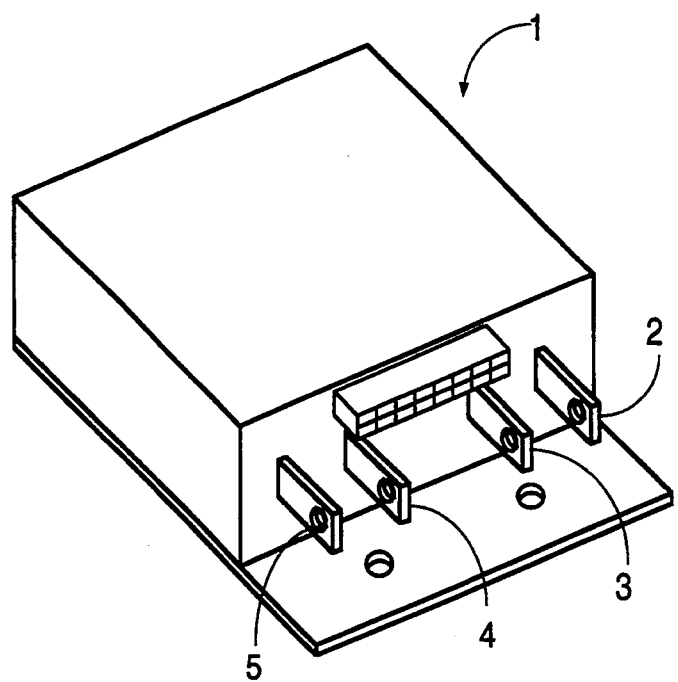
FIG. 1 is a perspective view of a motor controller and a programmer in accordance with the present invention.

FIG. 1 is a perspective view showing a motor controller 1 for controlling an electric motor of an electric vehicle. The motor controller 1 of FIG. 1 may be linked via a communication link to a programmer (not shown). The motor controller 1 may control the motor of an electric passenger automobile, an industrial vehicle, or a golf cart or other suitable electrically powered electric motor vehicle. Industrial vehicles which can be controlled by the motor controller 1 include relatively large industrial vehicles such as forklifts as well as fairly small industrial vehicles such as small flat bed trucks and small baggage handlers often seen in airports, hotels and warehouses, "small walkie" type material handling vehicles, small sweeper/scrubbers including rider sweeper/scrubbers, and other similar vehicles.

Figure 2A:
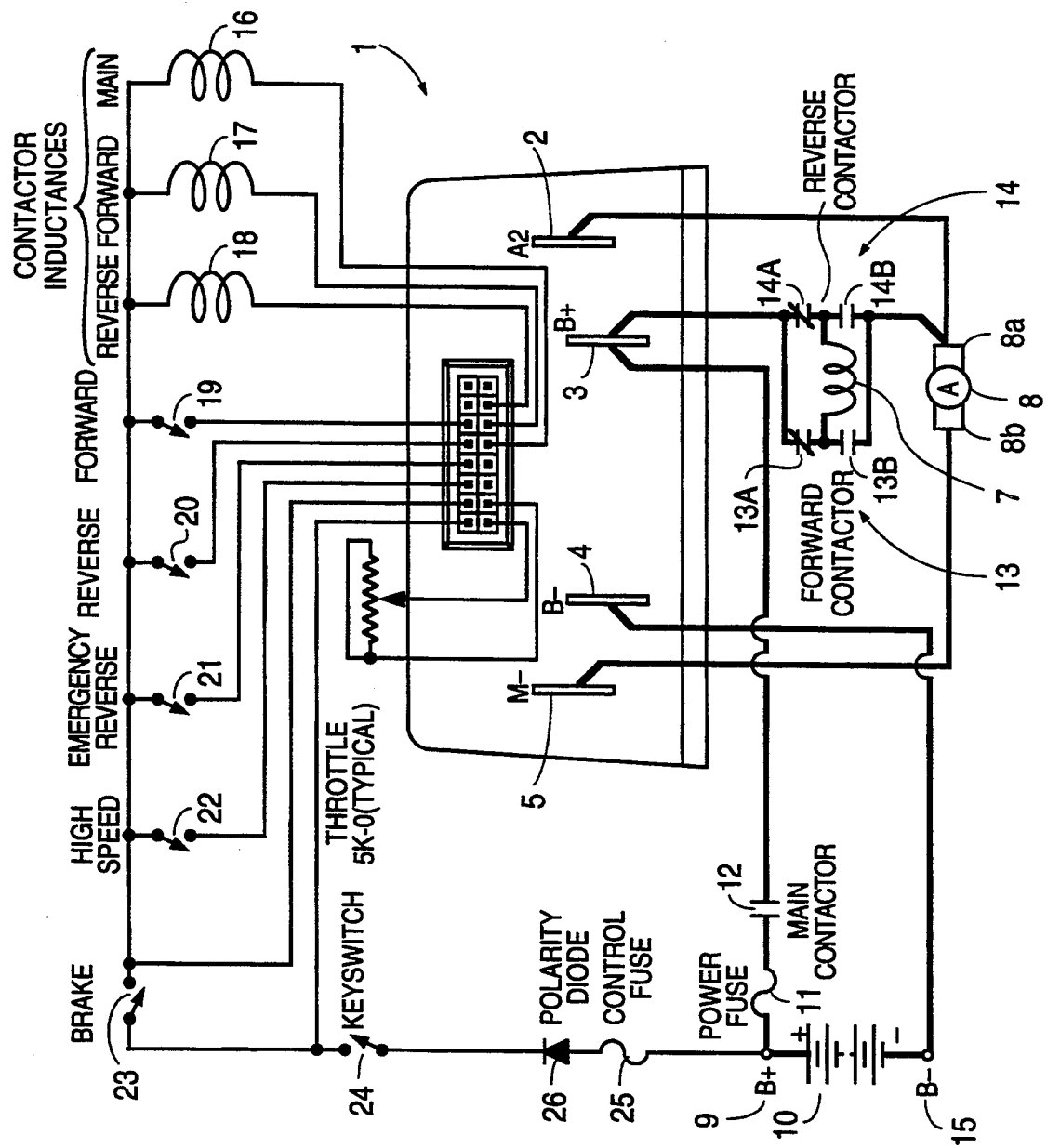
FIG. 2A illustrates external connections to the motor controller of FIG. 1 in accordance with the present invention.

FIG. 2A shows external power terminals 2-5 and a multi-terminal external control connector 6 of motor controller 1 connected to external circuitry of an exemplary electric vehicle. When the electric vehicle is to be driven in a forward direction by a series direct current electric motor comprising field winding 7 and armature 8, electric current is made to flow from the positive B+ terminal 9 of the battery 10, through power fuse 11, through main contactor 12 which is controlled to be conductive ("on"), to the B+ power terminal 3 of the motor controller 1, through a first part 13A of the forward contactor 13 which is on (a second part 13B of forward contactor 13 is nonconductive ("off")), through field winding 7 in a forward direction, through a second part 14B of a reverse contactor 14 which in on (first part 14A of second contactor 14 is off), through armature 8, to the M— power terminal 5 of motor controller 1, through motor controller 1 to B— power terminal 4 of motor controller 1, and to a negative B— terminal 15 of the battery 10. Forward contactor 13 operates such that one and only one of the first part 13A and the second part 13B is on at a time. Reverse contactor 14 operates in a similar way.

When the electric vehicle is to be driven in the reverse direction by the electric motor comprising field winding 7 and armature 8, electric current is made to flow from the positive B+ terminal 9 of the battery 10, through power fuse 11, through main contactor 12 which is controlled to be on, to the B+ power terminal 3, through first part 14A of the reverse contactor 14 which is on (second part 14A of reverse contactor 14 is off), through field winding 7 in a reverse direction, through a second part 13B of forward contactor 13 which in on (first part 13A of forward contactor 13 is off), through armature 8, to the M— power terminal 5, through motor controller 1 to B— power terminal 4, and to the negative B— terminal 15 of the battery 10. Because electric current flows in an opposite direction though field winding 7, the electric motor reverses its drive.

The main, forward, and reverse contactors 12, 13 and 14 are operated by main, forward, and reverse contactor inductances 16, 17 and 18, respectively. The motor controller 1 controls the main, forward and reverse contactors 12, 13 and 14 by driving current through the corresponding main, forward and reverse contactor inductances 16, 17 and 18 by driving the contactor driver terminals of control connector 6 labelled MAIN, FORWARD, REVERSE in FIG. 2B to a low voltage, respectively. If, for example, no current is flowing in main contactor inductance 16, then main contactor 12 is off (open circuited) as shown in FIG. 2A. If, for example, no current is flowing in forward contactor inductance 17, then first part 13A of forward contactor 13 is on and second part 13B of forward contactor 13 is off as shown in FIG. 2A. If, for example, no current is flowing in reverse contactor inductance 18, then first part 13A of reverse contactor 13 is on and second part 14B of forward contactor 14 is off as shown in FIG. 2A. The slash through a contactor symbol indicates the part of the contactor which is conductive when no current is flowing in its contactor inductance (contactor coil).

Figure 2B:
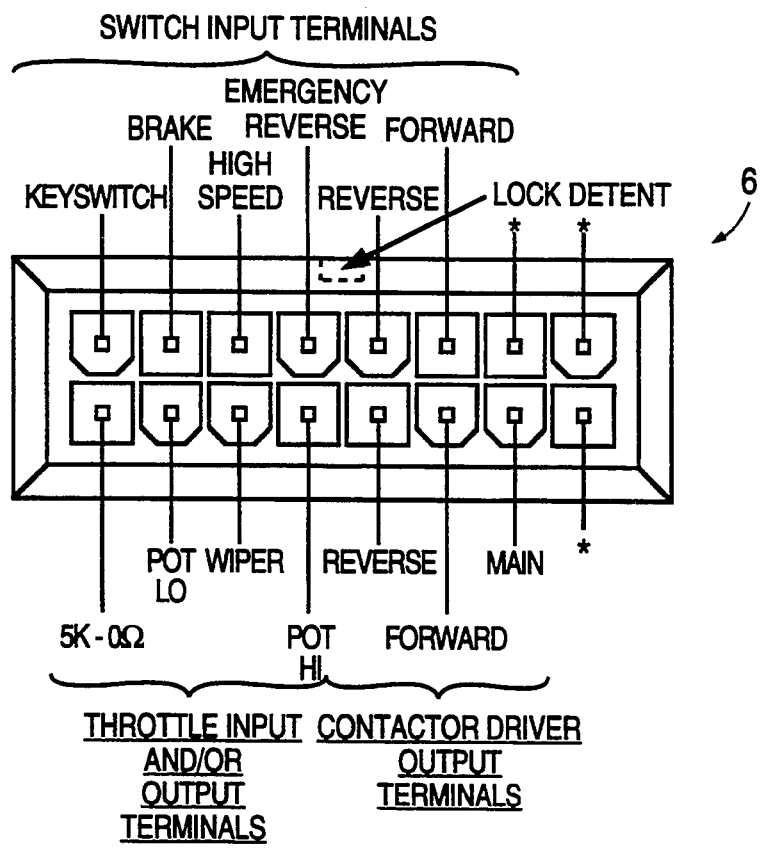
FIG. 2B is an expanded end-view of the control connector of the motor controller shown in FIG. 2A.

Motor controller 1 receives input signals from a user of the electric vehicle from a forward switch 19, a reverse switch 20, an emergency reverse switch 21, a high speed switch 22, a brake switch 23, and a keyswitch 24 on corresponding switch input terminals of control connector 6 labelled FORWARD, REVERSE, EMERGENCY REVERSE, HIGH SPEED, BRAKE and KEYSWITCH in FIG. 2B. The motor controller 1 is shown driving a throttle rheostat-type resistance and receiving an input signal from the throttle rheostat on the terminals of control connector 6 labelled 5K-0Ω and POT LO. Two additional throttle terminals, WIPER and POTHI, are not connected to external circuitry in the wiring configuration shown in FIG. 2A in FIG. 2B. Motor controller 1 uses the input signals received on control connector 6 to determine how to control the main, forward and reverse contactors 12, 13 and 14. A series-connected control fuse 25 and polarity diode 26 couple the positive B+ battery voltage to the control circuit switches 19–24 and the contactor inductances 16–18.

The electric motor can be disconnected from the battery 10 by controlling main contactor inductance 16 to release main contactor 12 into the off position, by controlling both forward and reverse contactor inductances 17 and 18 so that no current path through field winding 7 between the B+ terminal 3 and the armature 8 is established, and by controlling the motor controller 1 not to connect M− motor controller terminal 5 to B− motor controller terminal 4. When no current is being forced though the contactor inductances 16–18 by the motor controller 1, main contactor 12 is off, the second parts 13B and 14B of both the forward and reverse contactors are off, and M− terminal 5 is not connected by the motor controller to B− terminal 4.

Figure 3A:
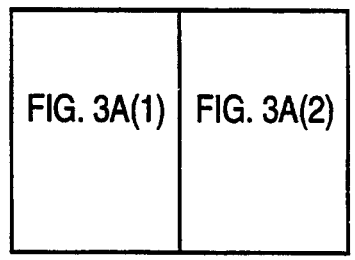
Figure 4A:
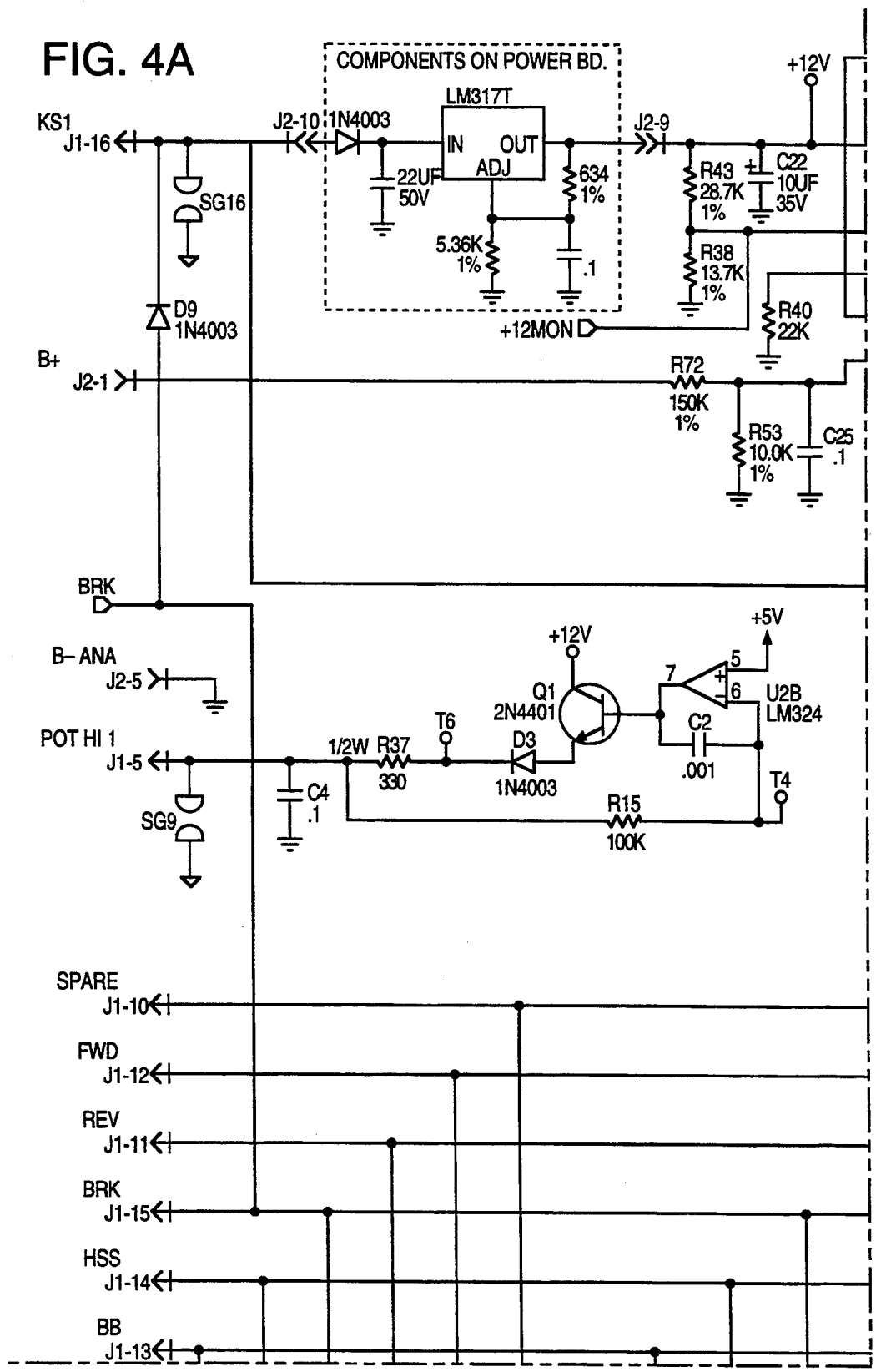
FIG. 4A-4D is a circuit schematic of the control section of the motor controller of FIG. 1 in accordance with the present invention.
Figure 4B:
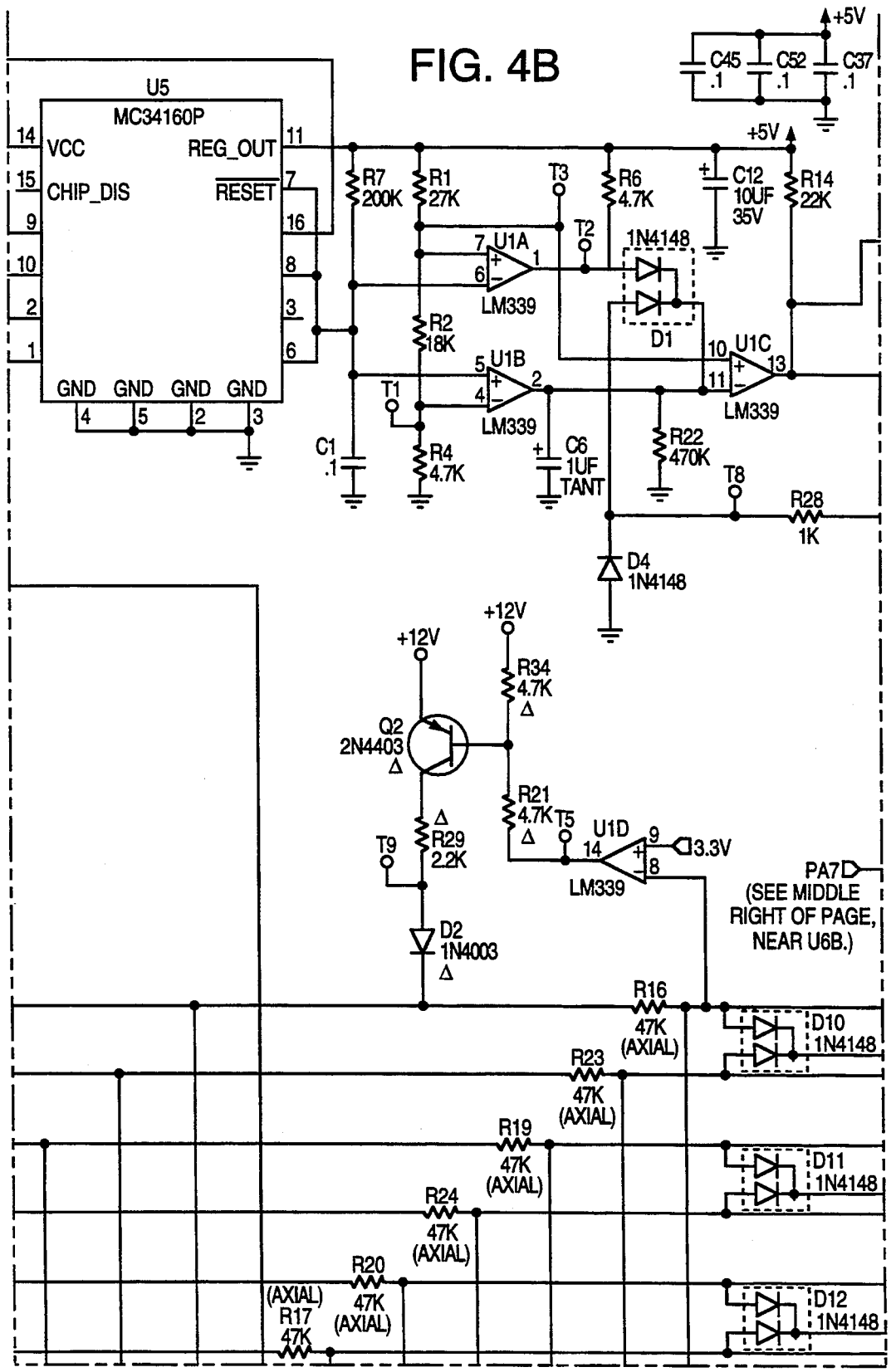
Figure 4C:
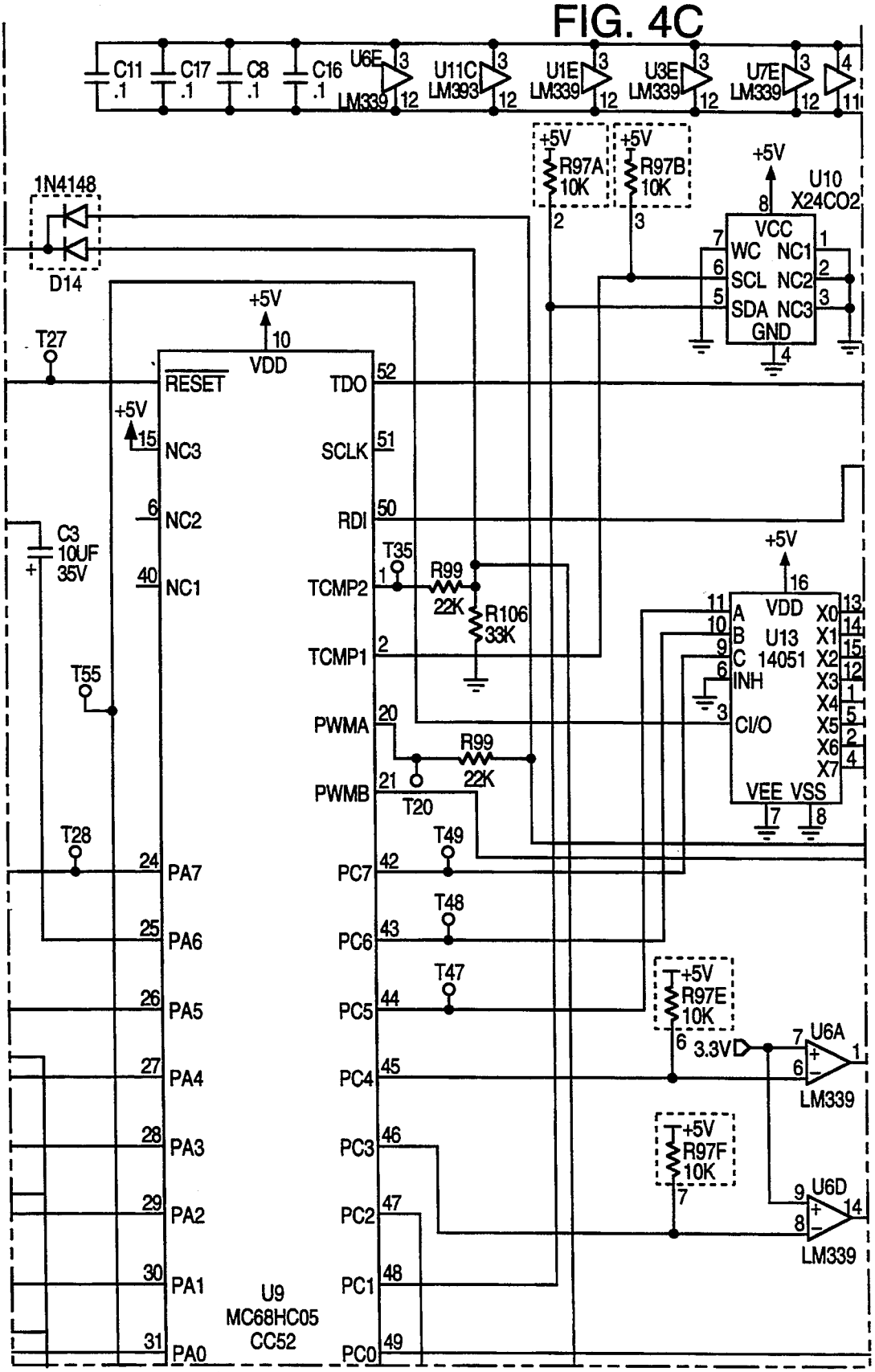
Figure 4D:
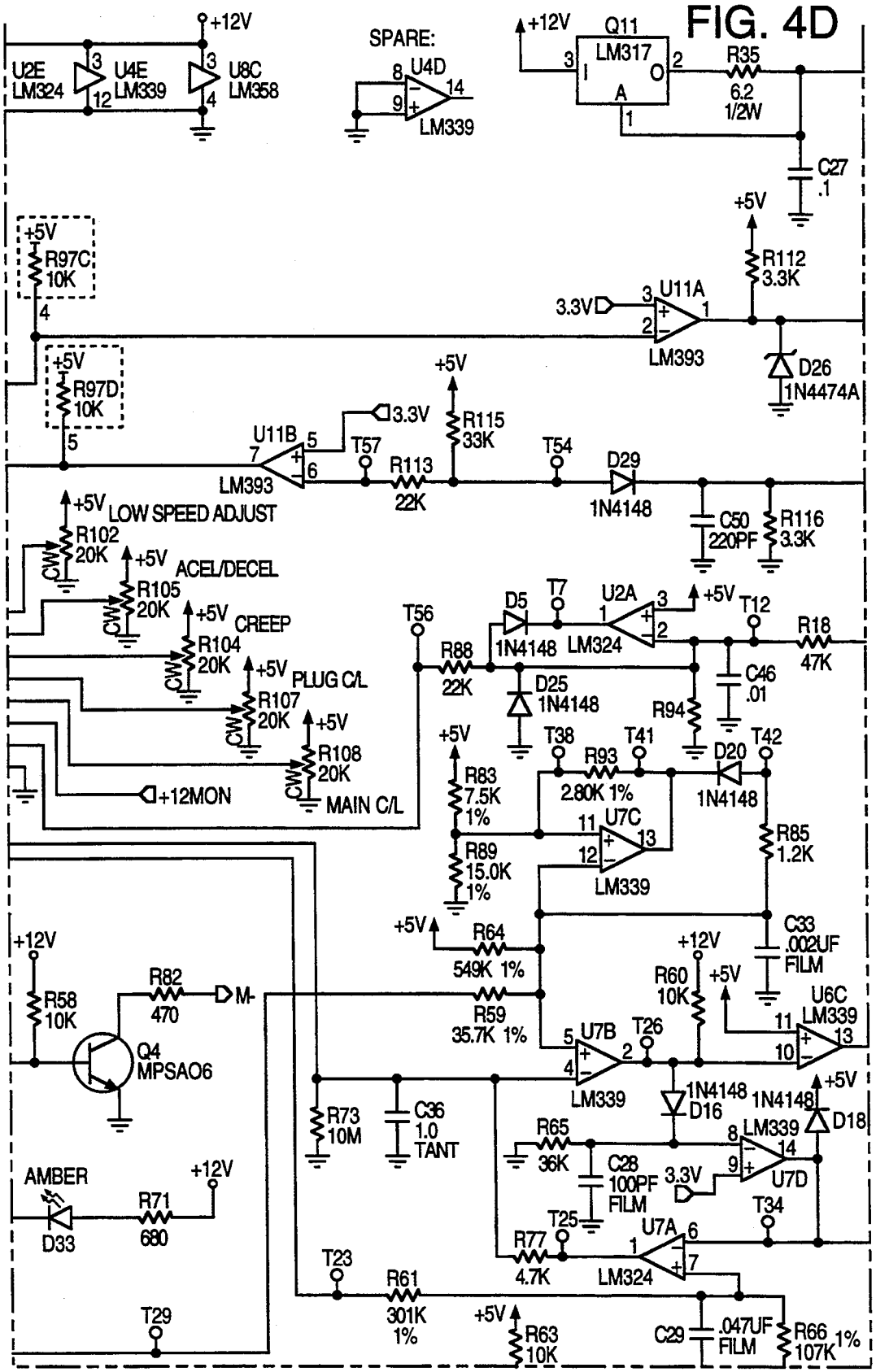
Figure 4E:
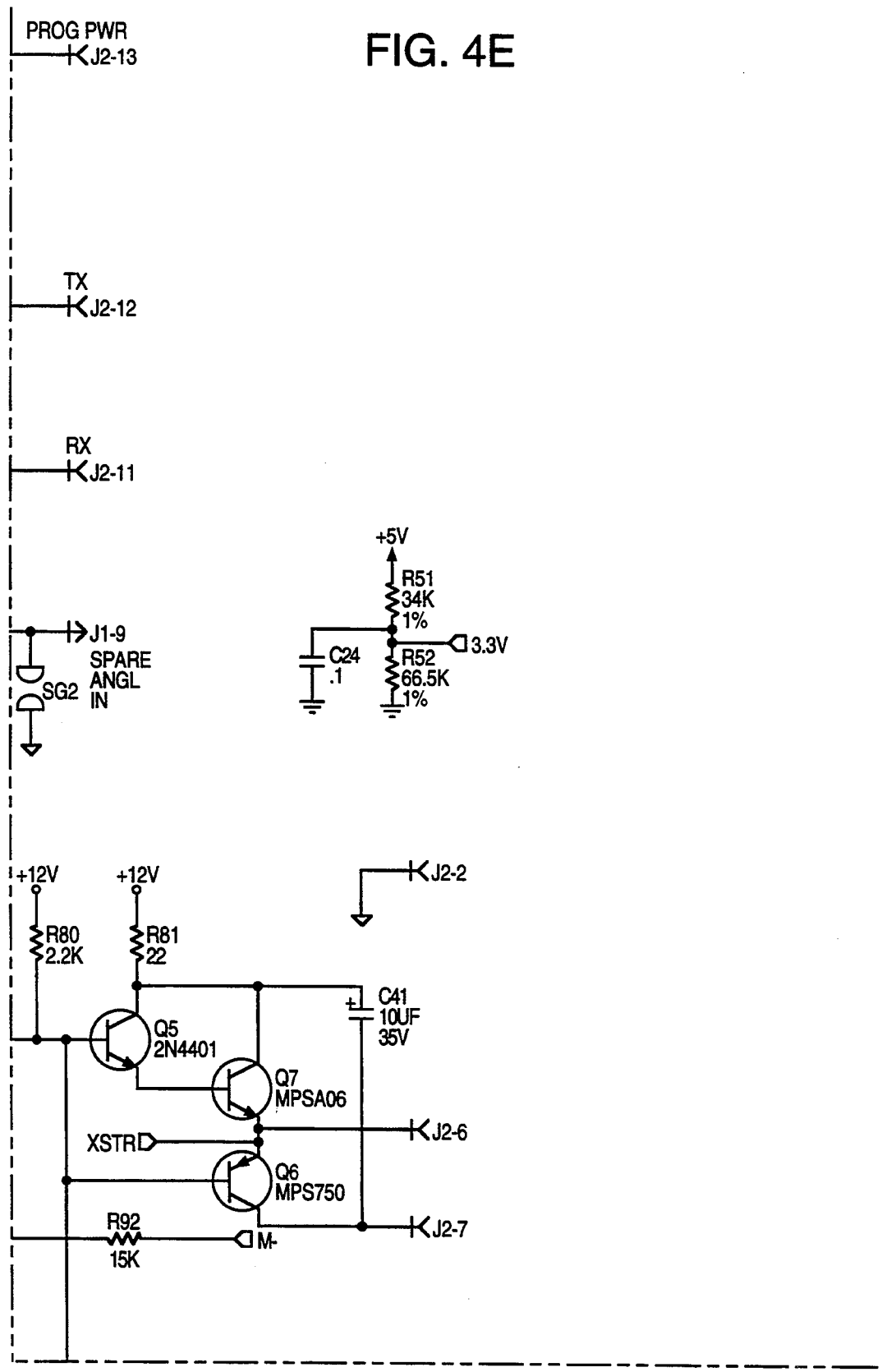
Figure 4F:
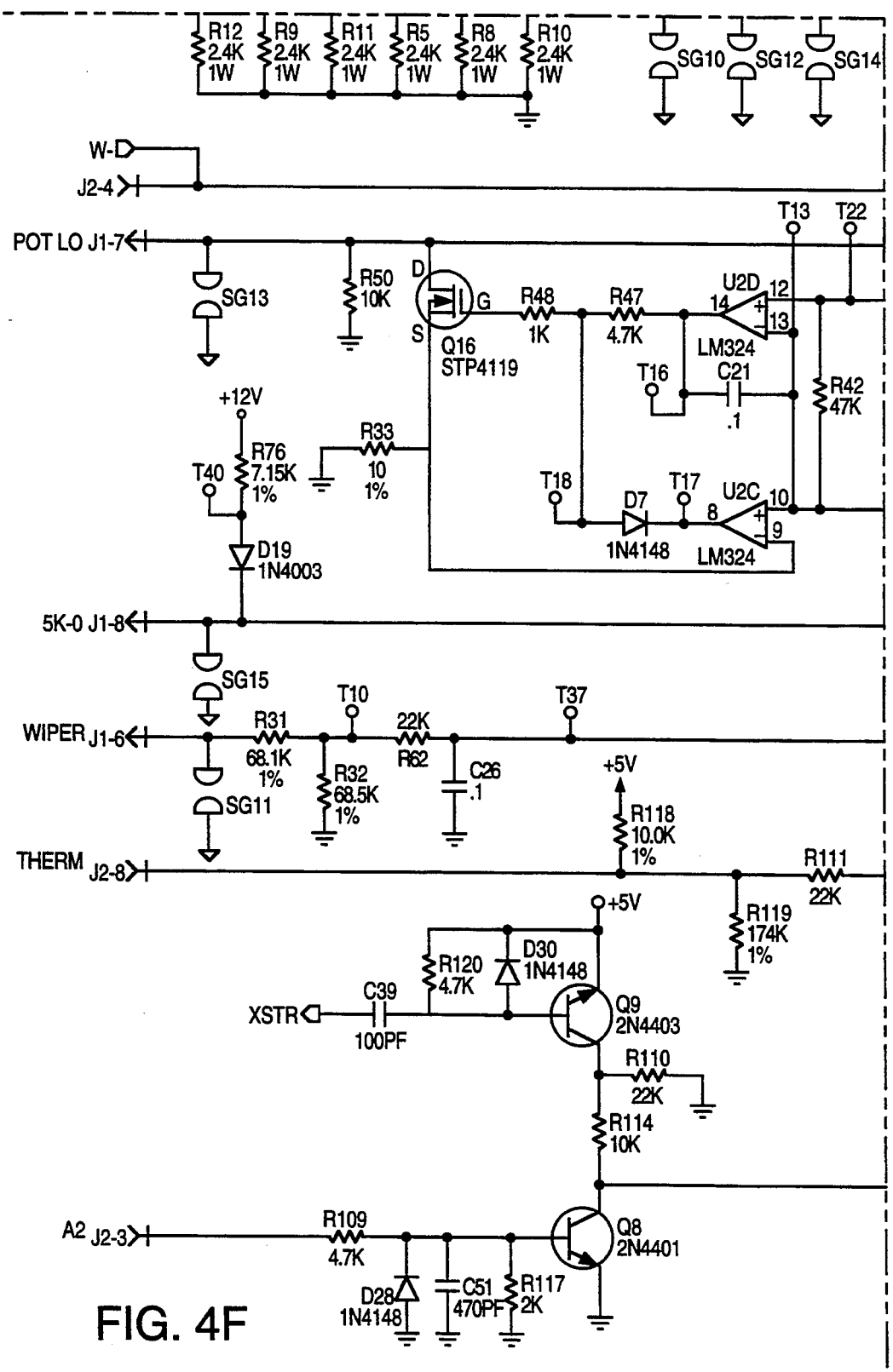
Figure 4G:
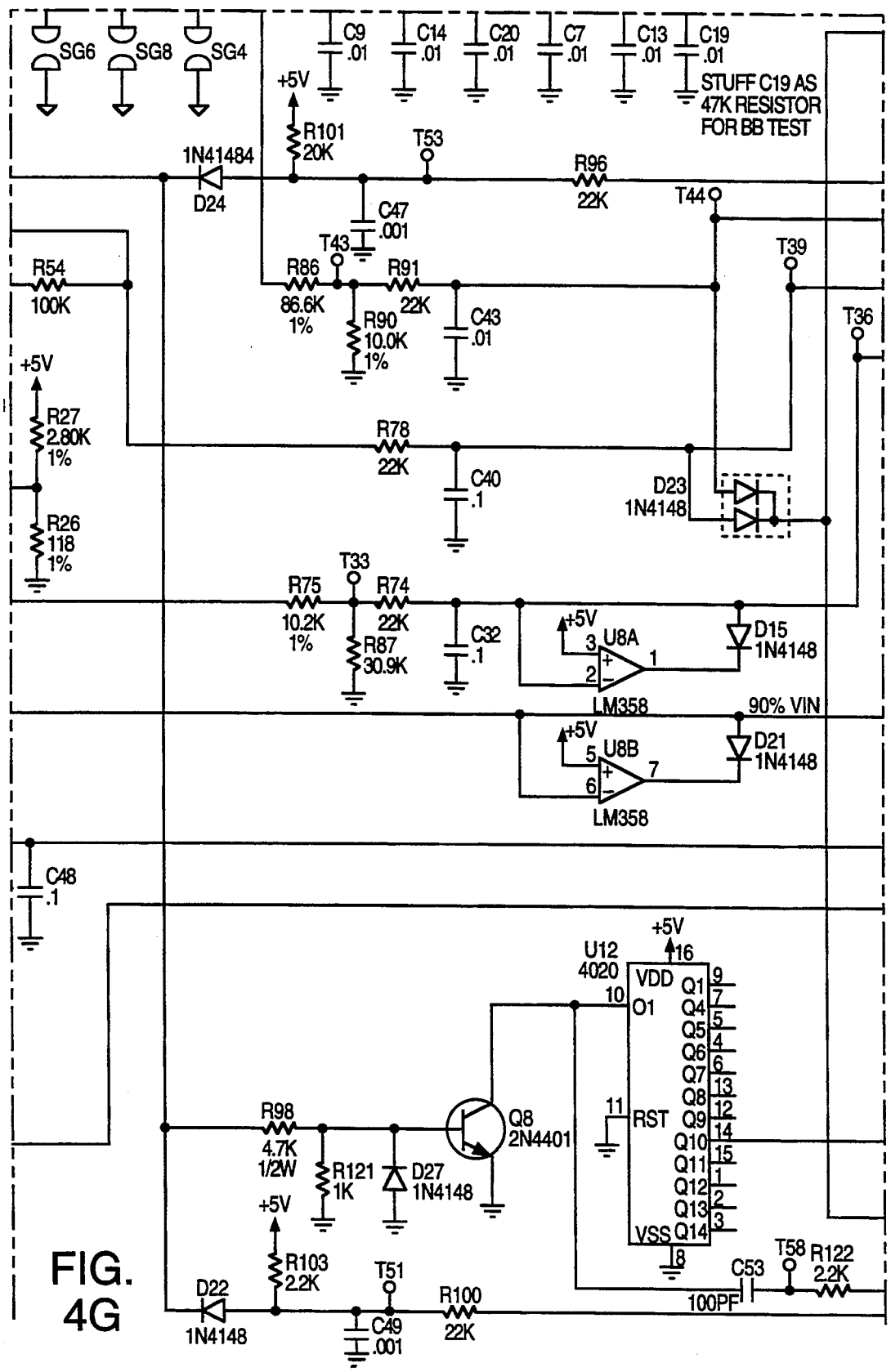
Figure 4H:
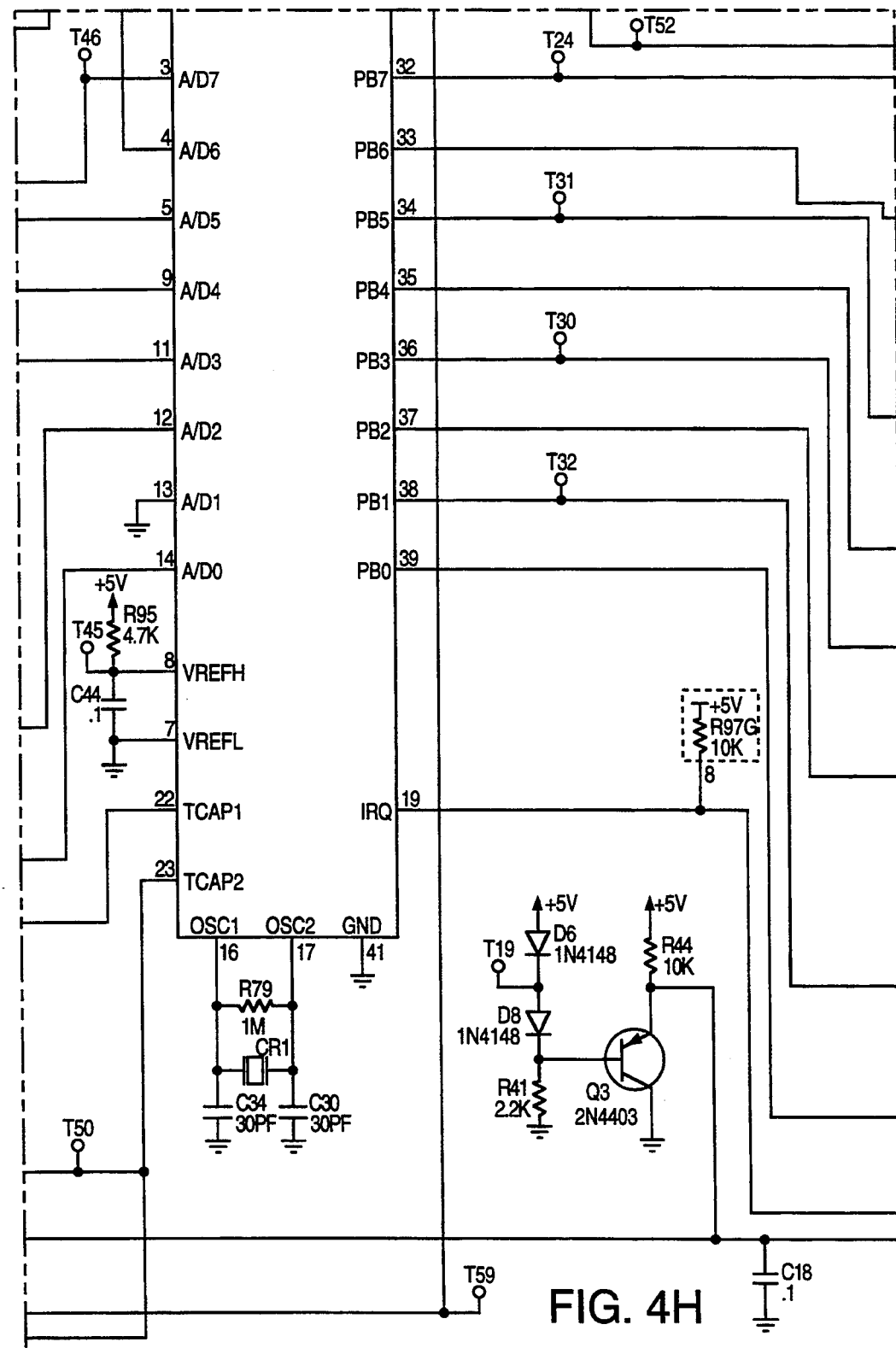
Figure 41:
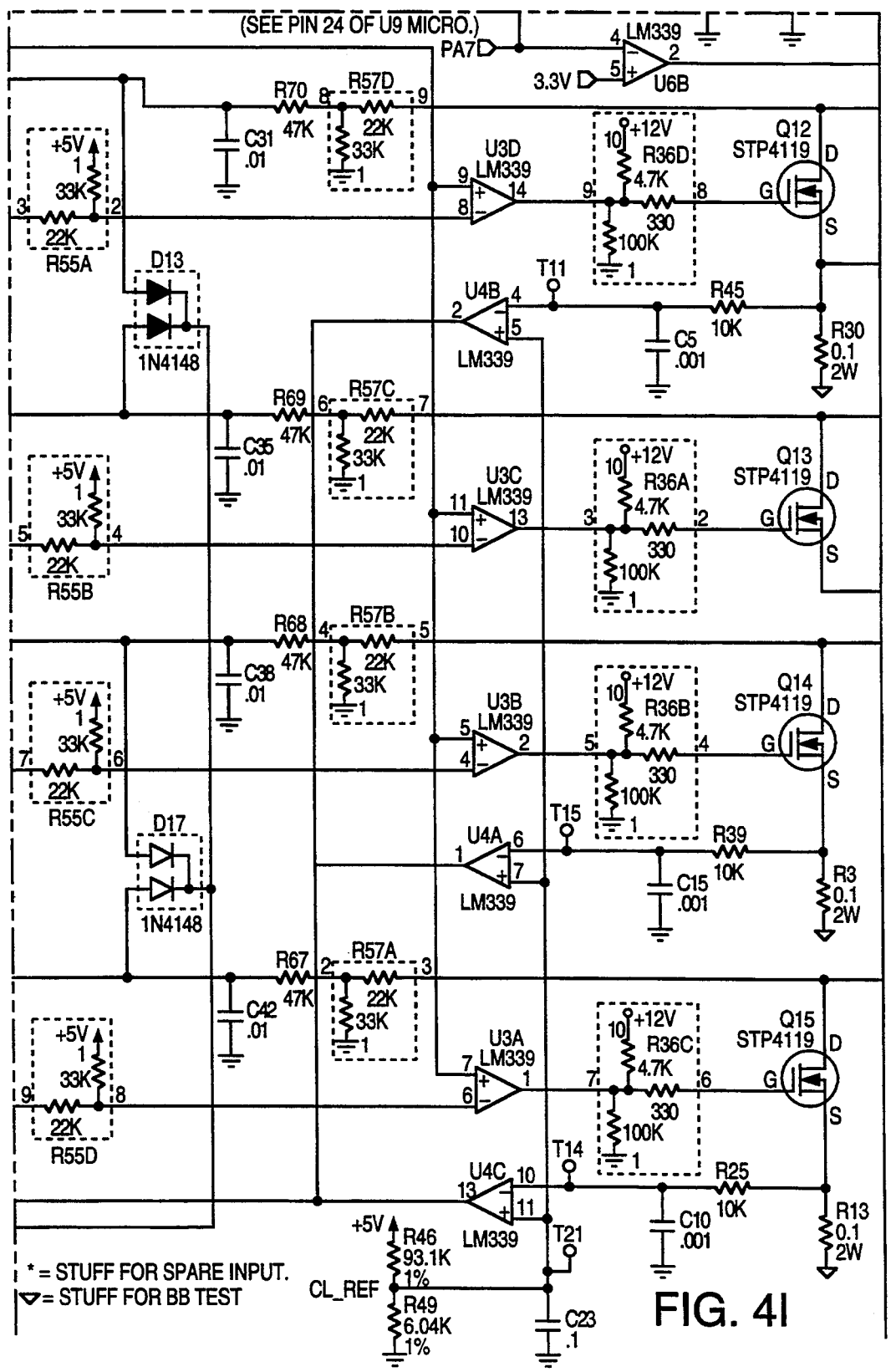
Figure 4J:
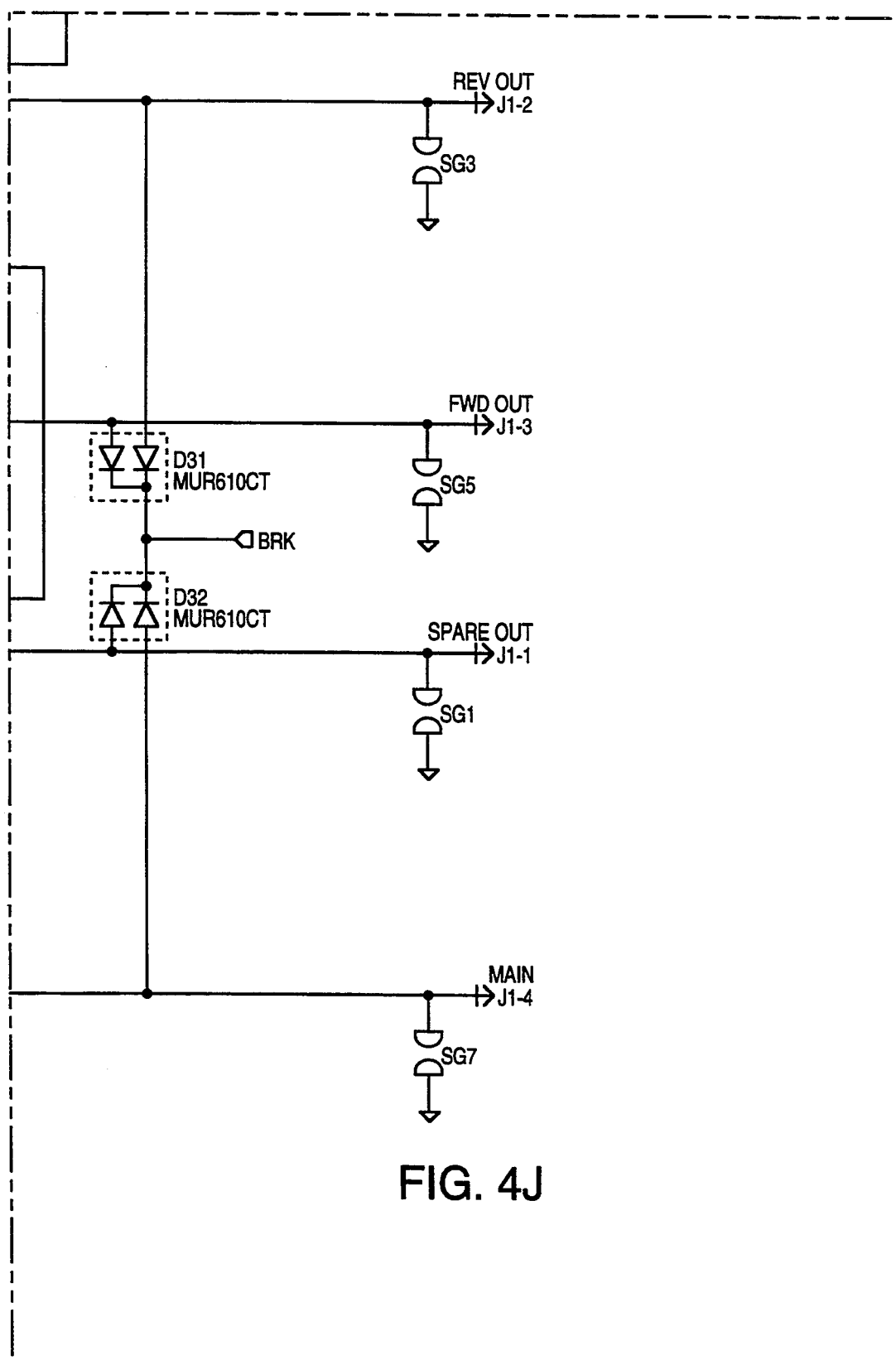

In the embodiment of the invention described here, motor controller 1 comprises a power section and a control section. The power section is shown in FIG. 3A–3B. The control section is shown in FIG. 4A–4D. A J3 connector terminal on the power section designated with the same J reference numeral as a J2 connector terminal with the same J reference number on the control section indicates an electrical connection between the power and control sections. The connector terminals of FIGS. 3A–3B and 4A–4D labelled KSI, BRK, HSS, BB, REV, FWD are coupled to the terminals of control connector 6 of FIG. 2B labelled KEYSWITCH, BRAKE, HIGH SPEED, EMERGENCY REVERSE ("belly button"), REVERSE, and FORWARD, respectively. The connectors of FIGS. 3A–3B and 4A–4D labelled 5K-0, POT LO, WIPER, POT HI 1, REV OUT, FWD OUT, and MAIN are coupled to the terminals of control connector 6 of FIG. 2B labelled 5K-0Ω, POT LO, WIPER, POTHI, REVERSE (contactor driver), FORWARD (contactor driver), and MAIN (contactor driver), respectively.

FIGS. 3A–3B shows the power section. A power MOSFET comprising a number of parallel-connected N-channel power MOSFETs Q1, Q2 and Q4–Q10 is connected to selectively couple the M− power terminal 5 of the motor controller 1 to the B− power terminal 4 of the motor controller 1. Note that the ground symbol in FIG. 3A–3B has the reference numeral B− to indicate that the ground symbol is connected to B− power terminal 4 of the motor controller. The gates of the parallel-connected power MOSFETs are connected via respective resistors R1–R9 to a connector terminal J3-6. When the voltage on connector terminals J2-6 and J3-6 is driven high by the motor controller control section, the parallel-connected power MOSFETs turn on to couple the M− and B− power terminals of the motor controller together.

A plug diode comprising a number of parallel-connected high power slow recovery diodes D6–D10 is connected between the A2 power terminal 2 of the motor controller 1 and the M− power terminal 5 of the motor controller, the anode of the plug diode being coupled to the M− power terminal 5, the cathode of the plug diode being coupled to the A2 power terminal 2. This plug diode is used to conduct current when current flow in the field winding is reversed while the vehicle is moving in order to provide braking. This type of motor assisted braking is called "plug braking". When the field winding current is reversed, the motor is turning in the direction opposite to which it is being driven. The motor therefore acts as a generator converting kinetic energy of the vehicle into electric current so that the terminal of the armature indicated 8a is driven negative with respect to the 8b terminal of the armature.

If no plug diode were present, a small amount of this generated reverse current would be forced back through the field winding which would in turn increase the strength of the flux of the field winding in turn causing the armature to generate a greater amount of reverse current which in turn would force more reverse current through field winding which in turn would increase the current generated by the armature causing the vehicle slam to a stop. Such runaway braking is difficult to control. The plug diode is provided across armature 8 in order to conduct that generated reverse current ("plugging current") from the 8b terminal of the armature to the 8a terminal of the armature, thereby preventing generated reverse current from flowing through the field winding. In this plug braking mode, the amount of braking is controlled by controlling the proportion of the time that the motor controller 1 couples M− power terminal 5 to B− power terminal 4 via the power MOSFETs in the motor controller.

A free wheeling diode comprising a number of parallel-connected diodes D1–D5 is connected between the M− power terminal 5 and the B+ power terminal 3, the anode being connected to the M− power terminal, the cathode being connected to the B+ power terminal. In the forward drive mode, the MOSFETs Q1, Q2 and Q4–Q10 are being turned off and on by the control section of the motor controller with a pulse-width modulated signal to control the electrical power being supplied to the motor. The motor armature 8 and motor field winding 7, however, represent a significant inductance which acts to resist the switching off of motor current by the MOSFETs. If no free wheeling diode were provided, the voltage across the motor inductance would spike to a high voltage possibly resulting in arcing and/or damage to motor controller circuitry. The free wheeling diode is therefore provided to short such a high voltage generated by the motor inductance when the MOSFETs are switched off.

The power section of motor controller 1 also includes a bank of parallel-connected capacitors C1–C14 connected in parallel with battery 10 between the B+ power terminal 3 and the B− power terminal 4 to handle surges in current demanded from the battery 10. A thermistor T1 is provided to monitor the temperature of the power section. A voltage regulator circuit comprising component LM317T converts an unregulated battery voltage which is typically between 48 and 16 volts down to a regulated 12 volt supply for use by the circuitry of the control section.

FIG. 4A–4D is a circuit schematic of the control section of the motor controller 1 which functions with the power section of FIG. 3A–3B. The connector input terminal labelled KSI receives a signal received from the keyswitch 24 as shown in FIG. 2A. When the keyswitch is closed, the positive battery voltage of about 24 volts is connected to KSI. This positive battery voltage is then regulated by the components shown in the dashed block of circuitry in the upper left hand corner of FIG. 4A–4D down to about 12 volts. The 12 volt output of the components in the dashed box is used as a 12 volt voltage supply for various components in FIG. 4A–4D. The components in the dashed block are the same components shown in the lower lefthand corner of FIG. 3A–3B and are physically located on a printed circuit board which carries the power section circuitry of FIG. 3A–3B. The symbol SG16, as well as the other similar looking symbols denoted SGXX elsewhere on FIG. 4A–4D, are spark gap structures fashioned into the traces on the printed circuit board of the control section to dissipate static electricity that might be introduced onto an external terminal of the motor controller 1.

After the production of the 12 volt signal, another voltage regulator comprising component U5 regulates the 12 volt signal down to a 5 supply voltage appropriate for powering digital electronics of the control section including a microcontroller U9. Component U5 also has sensing functions. Component U5 senses when its own 5 volt output supply voltage drops below a predetermined voltage. In this situation, component U5 performs a hardware reset on the microcontroller via the reset pin 18 of the microcontroller U9. Furthermore, component U5 monitors the +12 volt supply signal using the resistor divider comprising resistor R43 and R38. When the motor controller is being turned off (when the key switch input to the motor controller has been turned off and the 12 volt supply voltage begins to decay) component U5 senses this decay and resets the microcontroller before the 5 volts regulated voltage supply to the microcontroller goes out of regulation. Accordingly, an orderly shutdown of the microcontroller is possible when the keyswitch input turns off power to the motor controller. Moreover, component U5 monitors the battery voltage B+ of this system using a voltage divider comprising resistor R72 and R53. If this battery voltage B+ rises above a predetermined voltage, component U5 resets the microcontroller so that a complete reset and warm start of the microcontroller after an over voltage condition is performed. An undervoltage condition of the battery voltage is sensed by an analog to digital converter input pin of the microcontroller, pin 5. This permits the microcontroller to read the voltage at the key switch input KSI and to determine if that voltage has gone below the predetermined minimum voltage. Accordingly, undervoltage battery voltage monitoring is performed in software whereas overvoltage battery monitoring is performed in hardware.

To the right of component U5 is located a hardware watchdog timer circuit comprising components U1A–U1C. In normal motor controller operation, the microcontroller pulses a digital signal of about 50 Hertz into the hardware watchdog timer via digital output pin 25. If the microcontroller does not generate such pulse train, as for example in a condition in which the microcontroller has suffered a software failure, then the hardware watchdog timer will time out and reset the microcontroller U9 by forcing pin 18 of the microcontroller U9 low. The digital output pin 25 from the microcontroller U9 is A.C. coupled to the hardware watchdog timer by a capacitor C3 so that failures resulting in microcontroller U9 pin 25 being stuck high, stuck open or stuck low will cause the watchdog timer to reset the microcontroller. When the hardware watchdog timer resets the microcontroller, one of two diodes D14 becomes forward biased to stop the pulse-width modulated pulses output on connector terminal J2-6 which control the power MOSFETs that supply current to the motor. The motor is therefore not driven in a condition of a watchdog timeout. Similarly, the other of two diodes D14 also becomes forward biased to disable a reverse contactor driver circuit by forcing connector terminal J1-2 high, to disable a forward contactor driver circuit by forcing connector terminal J1-3 high, to disable a spare contactor driver circuit by forcing connector terminal J1-1 high, and to disable a main contactor driver circuit by forcing connector terminal J1-4 high. Because motor controller 1 turns the main, forward, and reverse contactors 12, 13 and 14 on by pulling current through the main, forward and reverse contactor inductances 16, 17 and 18 to ground, the forcing of the contactor driver output terminals high results in none of the main, forward, and reverse contactor inductances 16–18 being activated in a condition of a watchdog timeout.

Components U1D, Q2 and the associated components comprise a circuit for checking the integrity of the emergency reverse input into the motor controller. This feature is sometimes required to make sure that the wire extending from the emergency reverse switch on the vehicle has not become physically broken. If this wire is physically broken, a dangerous vehicle would result. If an operator driving the vehicle needed to use that emergency reverse function, the emergency reverse function would not work because the wire extending from the emergency reverse switch would be broken. Components U1D, Q2 and the associated components form a low power driver that outputs a signal onto a spare connector terminal J1-10. Depending on whether or not the components of this low power driver circuit provided in the controller, pin J1-10 can either be a spare input to the microcontroller or it can be an output from the microncontroller to drive that spare connector terminal J1-10 as an output. If J1-10 is used as an output, microcontroller U9 can use the low power driver circuit comprising components U1D and Q2 to drive the spare connector terminal J1-10 to 12 volts through resistor R29 and diode D2. If the wire extending from the emergency reverse switch is not broken, this voltage would feed back to the emergency reverse input at connector terminal J1-13. If, on the other hand, the wire extending from the emergency reverse switch is broken, the +12 volt signal will not return to connector terminal J1-13. Accordingly, the microcontroller can perform a check on the integrity of the wire by briefly pulsing a 12 volt voltage onto connector terminal J1-10.

Components U2B, Q1, C2, D3, R37, R15, and C4 comprise a POT HI driver circuit coupled to connector terminal POT HI 1. Components U2C, U2D, Q16, C21, R42, R54, R26, R27, D7, R33, R47, R48, R50, R78, and C40 comprise a POT LO driver circuit coupled to connector terminal POT LO. Connector terminals 5K-0 and WIPER are input terminals which enable the microcontroller U9 to read analog voltage levels including voltage levels associated with manipulation of a throttle device. The circuitry connected to connector terminals POT HI 1, POT LO, WIPER, and 5K-0 is provided to accommodate connection to various different kinds of external circuitry while at the same time providing the ability to detect faults in that circuitry. In some embodiments, for example, the WIPER connector input terminal receives a voltage signal from an electronic position sensor. In still other embodiments, the WIPER connector input terminal receives an analog input voltage signal from another system such as a guidance computer of an automatically guided vehicle.

Figure 5A:
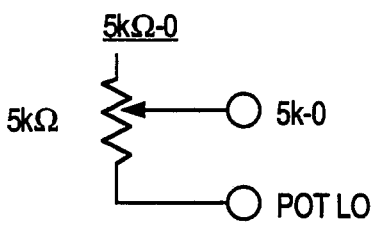
FIGS. 5A-5E illustrate various configurations for connecting control terminals POT HI, POT LO, WIPER, and 5k-0Ω of the control connector of a motor controller to external devices in accordance with the present invention.
Figure 5B:
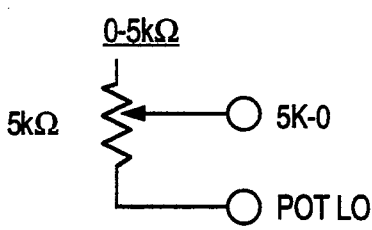
Figure 5C:
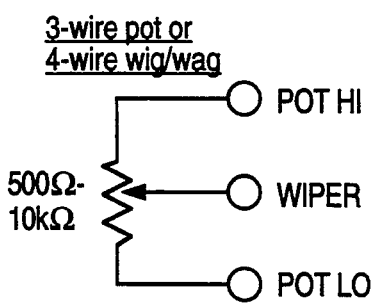
Figure 5D:
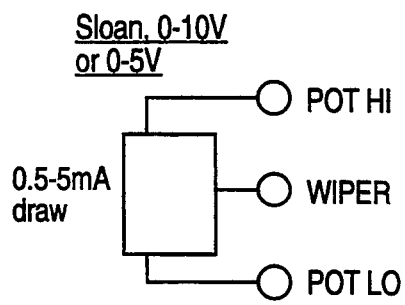
Figure 5E:
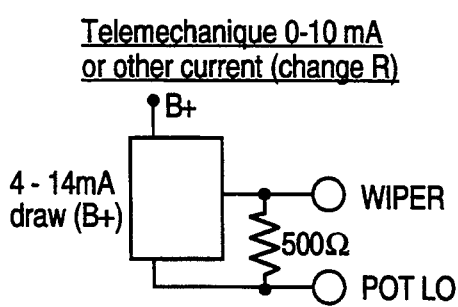

FIGS. 5A-5E show various possible configurations for connecting a throttle device. The throttle configurations of FIG. 5A and FIG. 5B are 2-wire rheostat type connections in which the resistance between two connector terminals 5K-0 and POT LO varies in response to throttle device position. The throttle configuration of FIG. 5C is a three-wire potentiometer-type configuration in which a voltage is placed across two terminals of a potentiometer via connector terminals POT HI 1 and POT LO and a voltage on an intermediate position on the potentiometer resistor varies in response to throttle position. The voltage at the intermediate position on the resistor is read by microcontroller U9 via connector terminal input WIPER. The configuration of FIG. 5D is an input device which generated an output signal voltage of 0-10 volts or 0-5 volts which varies with throttle position. The configuration of FIG. 5E is a configuration which accepts input from a device which generates an output which is a current that varies with throttle position.

Operation of the POT HI driver circuitry and POT LO driver circuitry of FIG. 4A-4D is explained in connection with a potentiometer-type configuration shown in FIG. 5C. The POT HI driver circuitry and the POT LO driver circuitry should be able to sense various types of faults. These faults may, for example, be faults of the throttle potentiometer itself or may be faults of the wiring connecting the throttle potentiometer to the motor controller. Amplifier U2B controls bipolar transistor Q1 so that the voltage on connector terminal POT HI 1 is equal to the 5 volt reference supply voltage supplied to pin 5 of the amplifier U2B. If more than 25 mA is supplied from the bipolar transistor Q1, the voltage across resistor R37 will increase, reducing the base-emitter voltage of bipolar transistor Q1. Accordingly, the POT HI driver circuitry outputs a 5 volt signal onto connector terminal POT HI 1 which is current limited at 25 mA.

The POT HI driver circuit is protected against shorting of connector terminal POT HI 1 to the B+ positive battery voltage by diode D3. If the POT HI 1 connector terminal is shorted to the 24 volt B+ positive battery voltage, diode D3 reverse biases thereby protecting transistor Q1 and amplifier U2B from the high voltage. The POT HI 1 driver circuit is also protected against shorting of connector terminal POT HI 1 to the B− battery ground voltage due to the current limiting effect of resistor R37. Resistor R37 functions to maintain the current flow in bipolar transistor Q1 at or below a current limit value which is sustainable by transistor Q1.

The POT LO driver circuit comprising components U2D, U2C, and Q16 functions as an appropriate closed-loop current limited voltage source which when connected to an external load which is itself connected on its opposite connection to a supply greater than 0.2 volts, outputs a voltage of approximately 0.2 volts above the B− battery voltage in non-current limited situations. Comparator U2D, N-channel MOSFET Q16, resistors R47, R48, R26, R54, R42, C21, R50 and R27 together function as a closed-loop voltage source to maintain the voltage on input pin 12 of comparator U2D equal to a 0.2 volt reference voltage created by the voltage divider formed by resistors R26 and R27.

The current which is sinked to ground by the POT LO driver circuit flows through N-channel MOSFET Q16. If this current reaches a current limit amount, then the voltage across resistor R33 increases sufficiently high to reach the 0.2 reference voltage on pin 10 of comparator U2C. In this situation, comparator U2C switches its output low, thereby decreasing the voltage on the gate of MOSFET Q16, thereby stopping the drain-to-source current of MOSFET Q16 from increasing beyond the current limit. The ratio of resistor divider network R27 and R26 and the resistance of resistor R33 therefore determine the magnitude of the current limit. The ratio of resistors R26 and R27 therefore determines the magnitude of the voltage output onto connector terminal POT LO during non-current limited situations.

The POT LO driver circuit is protected against shorting of connector terminal POT LO to the B+ positive battery voltage because such a situation would result in MOSFET Q16 being current limited. The POT LO driver circuit is protected against shorting of connector terminal POT LO to the B− negative battery voltage ground because this situation results in no current flowing in MOSFET Q16.

The connector terminal WIPER is coupled to an A/D converter input pin 12 of microcontroller U9. Accordingly, the microcontroller measures the magnitude of the analog voltage on the connector terminal WIPER. The intervening resistors R31 and R32 are provided to attenuate the magnitude of the signal on the WIPER input to allow measurement of a wide range of input voltages and to, along with V8B, D21 and R62, protect the A/D input pin 12 of the microcontroller U9 from voltages over 5 volts in conditions of the connector terminal WIPER being shorted to the 24 volt B+ positive battery voltage.

Faults are detected by the POT HI driver circuitry, the POT LO driver circuitry, and the WIPER input as follows. In fault situations in which a short across the entire potentiometer resistance, occurs the voltage on connector terminal POT LO will increase above 0.2 volts due to the 25 mA current limit of the POT HI driver circuit being greater than the 20 mA current limit of the POT LO driver circuit. Microprocessor U9 uses A/D converter input pin 9 to detect this fault by detecting a rise in voltage on connector terminal POT LO above 0.2 volts. Similarly, microcontroller U9 uses A/D converter input pin 9 to detect fault situations in which connector terminal POT LO is shorted to a high voltage level such as 5 volts or 24 volts or a low voltage such as ground. In normal situations, the voltage of the POT LO connector terminal read by the microcontroller should be 0.2 volts. In fault situations in which the potentiometer connection between connector terminals POT HI 1 and POT LO becomes open circuited, for example due to a broken potentiometer or a broken connection to the potentiometer, resistor R50 of the POT LO driver circuit pulls the voltage on connector terminal POT LO down to ground for fault detection by the microcontroller U9.

The connector terminals J1-10 through J1-15 are digital inputs for receiving switch signals SPARE, REV, FWD, BB, HSS, and BRK, respectively. These switch signals are coupled to respective digital input pins of microcontroller U9. It is through pins 26-31 that microcontroller U9 monitors the operation of switches 19-23 of FIG. 2A. The resistors R5, R8-12, and R16, R17, R19, R20, R23 and R24 and diodes D10-D12 attenuate the magnitude of the 24 volt signals from the switches down to 5 volt signals for inputing to microcontroller U9 input pins 26-31.

Analog input signal KSI present on connector J1-16, analog input signal M— present on connector J2-4, analog input signal POT LO present on connector J1-7, analog input signal 5K-0 present on connector J1-8, analog input signal WIPER present on connector J1-6, and analog input signal THERM present on connector J2-8 are read by microcontroller U9 on A/D converter input pins 5, 3, 9, 11, 12, and 14, respectively.

A plug detect circuit comprising components Q8, Q9, R110, R114, R117, C51, D28, R109, D30, R120 and C39 senses when the motor controller is plug braking. The output of the plug detect circuit is connected to a rising edge-triggered input pin 22 of the microcontroller U9. The connection indicator labelled XSTR connects capacitor C39 of the plug detect circuit to the voltage on connector terminal J2-6 which drives the gates of the power MOSFETs. Connector terminal A2 is coupled to the external power terminal A2 shown in FIG. 2A.

As explained above, plug braking causes the 8a terminal of the armature 8 to be at a lower potential than the terminal 8b of the armature 8. The plug diode of the power section connected across the terminals 8a and 8b of the armature forward biases so that a maximum positive voltage of approximately one forward bias diode voltage drop exists between armature terminals 8b and 8a. Typically a large plug current on the order of tens or hundreds of amperes flows in the plug diode during plugging.

One way to detect plug braking is to place circuitry in the path of the plug current to detect the plug current flowing through the plug diode directly. Such circuitry is, however, somewhat expensive. A more economical way to detect plug braking is to monitor the voltage across the plug diode during portions of the pulse-width modulated cycles of the power MOSFETs which pulse current through the motor. The power MOSFETs are pulsed on and off during each pulse-width modulated switching cycle to control the magnitude of the plug braking effect. If the plug diode becomes forward biased during such a MOSFET switching cycle, then plug braking is deemed to still be occurring. Problems, however, are associated with this way of detecting plug braking.

Take for example the situation in which it is desired to brake an electric vehicle and then, upon the vehicle stopping, to immediately reverse vehicle travel direction so that a fairly uniform deceleration and acceleration in an opposite direction is experienced. Waiting until the plug diode is not forward biased during any portion of an entire on portion of a MOSFET switching cycle before powering the motor in the opposite direction results in the vehicle being braked by plugging during a first time period, the motor torque of the vehicle being substantially dead for a second time period, and then the motor powering the vehicle in the opposite direction during a third time period. In the second time period, the braking effect of plugging is substantially exhausted well before the plug diode ceases to be forward biased throughout one entire on portion of a MOSFET switching cycle.

The plug detect circuit of the present invention therefore detects the transition from plugging to nonplugging to be closer to the end of the braking effect before the braking effect substantially subsides. Consequently, the motor can be powered in the opposite direction closer in time to the end of braking thereby yielding a smoother forward-to-reverse vehicle motion or reverse-to-forward vehicle motion.

The plug detect circuit detects the end of plugging to be the point in time or substantially close to the point in time where plugging current no longer flows continuously throughout the entire on portion of each switching cycle of the power MOSFETs. We call this "continuous" plug diode conduction detection. Changing the power supplied to the motor using this change in plug diode conduction as an indicator of the end of plugging results in improved vehicle deceleration and acceleration in an opposite direction.

Figure 6:
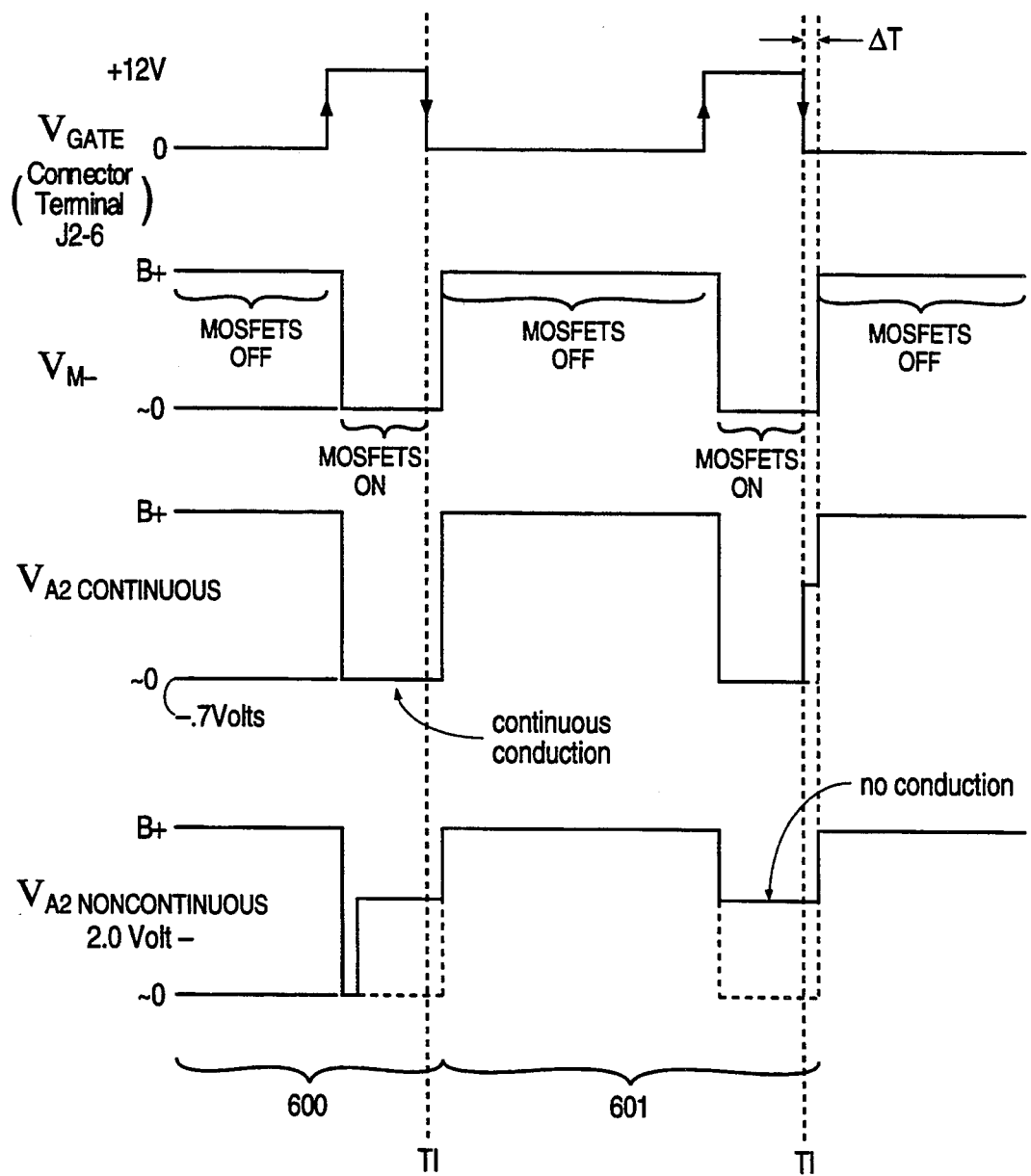
FIG. 6 illustrates waveforms representing the operation of a plug detect circuit in accordance with the present invention.

Operation of the plug detect circuit shown in FIGS. 4A-4D is explained in connection with the waveforms of FIG. 6. The waveform labelled $V_{GATE}$ represents the voltage on connector terminal J2-6 which drives the gates of the power MOSFETs on and off to control the desired magnitude of plug braking effect. Plug braking occurs when the MOSFETs are turned on, the motor being powered in reverse to counteract the motion of the vehicle. The waveform labelled $V_{M-}$ represents the voltage on external M— power terminal 5 with respect to the B— battery voltage on the external B— power terminal 4. The M— power terminal is seen to be coupled to the B— power terminal when the MOSFETs are turned on in the on portion of each pulse-width modulated switching cycle.

The waveform labelled $V_{A2noncontinuous}$ represents a transition of the voltage on the A2 power terminal 2 with respect to the voltage on the B— power terminal 4. The two cycles 600 and 601 of the waveform labelled $V_{A2noncontinuous}$ represent the transition of plug diode operation where plug conduction ceases entirely. When the MOSFETs are on in cycle 600, the plug diode conducts for a short period of time, whereas when the MOSFETs are on in cycle 601, the plug diode does not conduct for any substantial period of time. The voltage of the $V_{A2noncontinuous}$ waveform during the non-conduction of the plug diode when the MOSFETs are on is determined at least in part by an impedance voltage divider formed by the armature and the field winding of the motor. The voltage of the $V_{A2noncontinuous}$ waveform during the conduction of the plug diode when the MOSFETs are on is substantially 0 volts as illustrated in FIG. 6.

The waveform labelled $V_{A2continuous}$, represents a transition of the voltage on the A2 power terminal 2 with respect to the voltage on the B− power terminal 4. This transition of plug diode operation is the transition which the plug detector circuit of the present invention seeks to detect. The two cycles 600 and 601 of the waveform labelled $V_{A2continuous}$ represent a transition of plug diode operation when the plug diode first does not conduct during a predetermined period of time or at a predetermined instant in which the power MOSFETs are on. In the waveform labelled $V_{A2continuous}$, the plug diode conducts throughout the entire period of time that the power MOSFETs are on during cycle 600, whereas the plug diode does not conduct during a short period of time at the end of the period in which the power MOSFETs are on in cycle 601.

The plug detect circuit of the present invention detects the voltage at time T1 during each cycle. Time T1 is substantially at the end of the on portion of the switching cycle of the power MOSFETs. In one specific embodiment illustrated in FIG. 6, time T1 is $\Delta T$ before the rising edge of $V_{M-}$. In this specific embodiment, $\Delta T$ is approximately 1 μsec plus or minus approximately 50 percent. If the voltage on the A2 power terminal is less than a decision level of 2.0 volts at this time T1, plug braking is detected by detection of a forward biased plug diode. If the voltage is greater than 2.0 volts at this time T1, plug braking is no longer detected because the plug diode is not detected to be forward biased.

Resistors R109 and R117 comprise a voltage divider so that a 2.0 volt signal is required on connector terminal A2 to turn bipolar transistor Q8 on. Pin 22 of the microcontroller U9 is therefore held at ground by transistor Q8 anytime connector terminal A2 is above 2.0 volts. When connector terminal A2 is below 2.0 volts, the voltage on pin 22 of the microcontroller U9 may be pulled high by transistor Q9 during the high-to-low transitioning of the voltage on connector J2-6 which turns off the power MOSFETs. When the voltage on connector terminal J2-6 transitions high-to-low, A.C. coupling capacitor C39 functions to turn transistor Q9 on momentarily before the power MOSFETs actually turn off. If, during this momentary conduction of transistor Q9, the voltage on connector terminal A2 is below 2.0 volts, then the voltage on edge-sensitive pin 22 of the microcontroller rises to latch the detection of no change in plug diode operation into the microcontroller U9. On the other hand, if, during this momentary conduction of transistor Q9 the voltage on connector terminal A2 is above 2.0 volts, then the voltage on edge-sensitive pin 22 of the microcontroller U9 remains low and detection of a change in plug diode operation is latched into the microcontroller U9.

The magnitude of the 2.0 volt decision level at time T1 can be raised or lowered by varying the ratio of the resistances R109 and R117 of the voltage divider. In some embodiments, the latching of the rising edge of the voltage on pin 22 causes the value of a timer to be loaded into a register to time stamp the occurrence of the rising edge for later processing by microcontroller software.

A pulse width modulation measurement circuit for measuring the duty cycle of the pulse width modulation signal on connector J2-4 comprises components U12 and Q10. The output of this circuit is coupled to microcontroller U9 rising edge-sensitive input pin TCAP2.

Components CR1, C30, C34 and R79 comprise a 4 MHz ceramic resonator circuit for the microcontroller U9.

A clamp circuit comprising components Q3, D6, D8, R41 and R44 is a voltage source which is used to ensure that various of the inputs to microcontroller U9 do not exceed 5 volts. The diode drop of diode D8 is matched by the voltage drop across the base-emitter junction of bipolar transistor Q3. The diode drop from the 5 volt supply to which diode D6 is connected is matched by the various diode pairs D10–D13, D17, D23. If a voltage on a signal line connected to one of the anodes of diode pairs D10–D13, D17 and D23 were to attempt to exceed 5 volts, the diode connected to that signal line would conduct to hold the voltage of that signal line voltage at approximately 5 volts.

There are four contactor inductance driver circuits driving connector terminals J1-1 through J1-4. The main contactor inductance driver circuit driving connector terminal J1-4 is explained here. The other contactor inductance driver circuits have a substantially identical structure. A digital output pin 39 from the microcontroller outputs a digital signal through pullup resistor structure R55D to comparator U3A. Not only does comparator U3A provide for the disabling of the output driver circuit driving the main contactor during watchdog timeouts as described above, comparator U3A also level shifts the 5 volt signal from the microcontroller U9 into a 12 volt signal for driving MOSFET Q15. The voltage on connector terminal J1-4 is normally maintained at about 24 volts due to the pull-up action of the main contactor inductance. When the voltage on connector terminal J1-4 is high, no current flows through main contactor inductance 16 of FIG. 2A and main contactor 12 is not turned on. Microcontroller U9 can, however, selectively turn MOSFET Q15 on to pull the voltage on connector terminal J1-4 to ground through MOSFET Q15 thereby pulling current through contactor inductance 16 and thereby turning main contactor 12 on. The Main contactor inductance driver circuit as well as the other three contactor inductance driver circuits can be pulse width modulated by a single microcontroller output signal output from microcontroller U9 output pin 1. If too high a current flows in MOSFET Q15, a sufficiently large voltage drop develops over resistor R13 which results in comparator U4C interrupting the microcontroller U9 via interrupt input pin 19. In such a high current condition, microcontroller U9 turns the MOSFET driving the contactor inductance off before it can be damaged. Connector terminals J1-1 through J1-4 are therefore protected from shorting to 24 volts.

A weld-checking circuit comprising components U6A, R58, Q4 and R82 allows the microcontroller U9 to briefly attempt to connect M− power terminal 5 to the B− battery voltage. If, for example, one of the contactors is welded on, microcontroller U9 can cause output pin 45 of microcontroller U9 to attempt to short the voltage on the M− power terminal 5 to the B− power terminal 4 using only the weak power driver of transistor Q4 and without turning on the power MOSFETs. If one of the contactors is welded on, then the voltage on the M− power terminal should not be observed to change at microcontroller A/D input pin 3 due to the weak pull down of transistor Q4. If, on the other hand, no contactor is welded on, then the voltage on the M− power terminal should be observed at microcontroller A/D input pin 3 to be the B− battery voltage because the weak power driver transistor Q4 is adequate to discharge the open circuit to the B— battery voltage.

A light emitting diode (LED) D33 is controlled by output pin 46 of microcontroller U9 to flash sequential error codes which are visible from the outside of the motor controller 1. A user who does not have access to programmer 100 can reference a table of flash sequences to gain some diagnostic information about the operation of a motor controller generating a sequence of error code flashes.

As can be seen from FIG. 3A–3B, the power MOSFETs Q1, Q2 and Q4–Q10 which drive the motor are controlled by the voltage on connector terminal J2-6. The voltage on connector terminal J2-6 is controlled by the microcontroller via pulse width modulation output pins 20 and 21 and a power MOSFET driver circuit comprising components U6B, U7A, U7B, U6C, and Q5–Q7. The pulse width signal present on output pin 20 is smoothed by RC network R73 and C36 to become a D.C. analog signal roughly proportional to the duty cycle of the voltage on connector J2-6. The pulse width signal present on output pin 21 is smoothed by RC network R66 and C29 to become an analog signal roughly proportional to motor controller's current limit.

The power MOSFET driver circuit comprises a triangle wave oscillator including the component U7C. The frequency of the triangle wave generated by the triangle wave oscillator can be shifted from 15 KHz to 1 KHz by an input to the triangle wave oscillator which comes from PCO pin 49 of the microcontroller. The 1 KHz frequency is the frequency used in plugging. When PCO pin 49 of the microcontroller is tristated, the triangle wave oscillator runs at 1 KHz. When PCO pin 49 of the microcontroller outputs a +5 volt signal, resistor 59 becomes active in the triangle wave oscillator circuit to shift the frequency of the resulting triangular wave to 15 KHz. The output of microcontroller pin 20 is itself a pulse width modulated waveform which is integrated to a DC level by the integrator consisting of R56 and C36. That DC level is compared to the triangle wave by comparator U7B to produce a pulse width modulated waveform. This pulse width modulated waveform is inverted and buffered by component U6C and is then supplied to a discrete transistor gate drive amplifier consisting of components Q5, Q6, Q7 and the associated components which drive the output at terminal connector J2-6. Terminal connector J2-7 is a B— single point ground return to the power board which is provided specifically for the gate drive signal circuitry. A separate ground return is provided for the circuitry generating the gate drive signal on connector terminal J2-6 to prevent that circuitry from affecting the ground voltage supplied to other analog components of the motor controller. Component U7A is provided to detect the voltage across the MOSFETs and compare that voltage to a reference level in order to get an indication of the current flow through the MOSFETs. The M— voltage, which is the voltage across the MOSFETs, is supplied to one input of comparator U7A. The other input of comparator U7A is a DC level, the magnitude of which is controlled by pulse width modulation output pin 21 of the microcontroller and RC integrator comprising R61, C29 and R66.

This method of sensing MOSFET current by measuring the voltage drop across the MOSFETs works well. It does, however, require an additional circuit called a disabler. Although it is possible to measure the current flowing through the MOSFETs by looking at the voltage drop across the MOSFETs when they are on, it is not possible to do so when the MOSFETs are off because no current is flowing when the MOSFETs are off. The voltage drop across the MOSFETs when the MOSFETs are off is also very high. This high voltage bears no relation to the motor current. Accordingly, the current monitoring circuit comprising component U7A is disabled when the MOSFETs are off. The current monitoring circuit comprising comparator U7A is also disabled for a short period of time after the MOSFETs are first turned on in order to allow the voltage drop across the MOSFETs to reach a stable level. Accordingly, comparator U7D and the associated components perform a timing function similar to a one shot multivibrator, the period of which is determined by capacitor C28 and resistor R65. This disabler circuit samples the pulse width modulation signal output from component U7B using diode D16 and clamps the M— input to comparator U7A using the output of comparator U7D.

Component U6B permits the microcontroller to take over control and to disable the output of the pulse width modulator circuit driving terminal connector J2-6 in case of a fault condition. One input of comparator U6B is driven by pin 24 of the microcontroller. Although the microcontroller could disable the output of the pulse width modulation circuit using the pulse width modulation pin of the microcontroller, this type of disabling involves a delay in the circuitry of the pulse width modulation circuit. Furthermore, certain faults in the pulse width modulation output circuitry may prevent the pulse width modulation output signal generated by the microcontroller from disabling the signal output onto connector terminal J2-6. The provision of disabling comparator U6B allows the comparator to disable the pulse width modulation circuit closer to the terminal J2-6.

A series of user adjustable trim pots R102, R105, R104, R107, and R108 are provided to allow the user to manually adjust the low speed, acceleration/deceleration rate, creep speed, plugging current limit, and main motor current limit. These adjustments, as well as a spare analog input external control terminal voltage on connector terminal J1-9, are multiplexed through analog multiplexer U13 into A/D converter input pin 4 of microcontroller U9. The particular signal to be read is selected by microcontroller U9 by controlling the digital select inputs of the multiplexer U13 appropriately via microcontroller output pins 42, 43 and 44.

Connector terminal J1-11 couples signal RX received from the programmer (not shown) into input pin 50 of the microcontroller U9. Similarly, connector terminal J1-12 couples signal TX on output pin 52 of microcontroller U9 to the programmer. Signals RX and TX together comprises a bidirectional serial communication link. Components U11A, R112, D26, U11B, R116, C50, D29, R115, R113 are provided to ensure that connecting a faulty programmer to connector terminals J1-11 and J1-12 will not damage the motor controller 1 and vice versa.

A current limit circuit is provided comprising components LM317, R35 and C27. This current limit circuit outputs a current limited 12 volt power supply onto connector terminal J2-13 for powering a programmer. Accordingly, connecting a faulty programmer which shorts connector terminal J2-13 ground will not cause a loss of the 12 volt supply voltage of the motor controller 1 and will not cause the motor controller to fail.

Component U10 is an electrically erasable programmable read only memory (EEPROM) which is read from and written to in a serial fashion by microcontroller U9 pins 2 and 48. This EEPROM stores information including configuration data and data identifying the type of motor controller.

Figure 7:
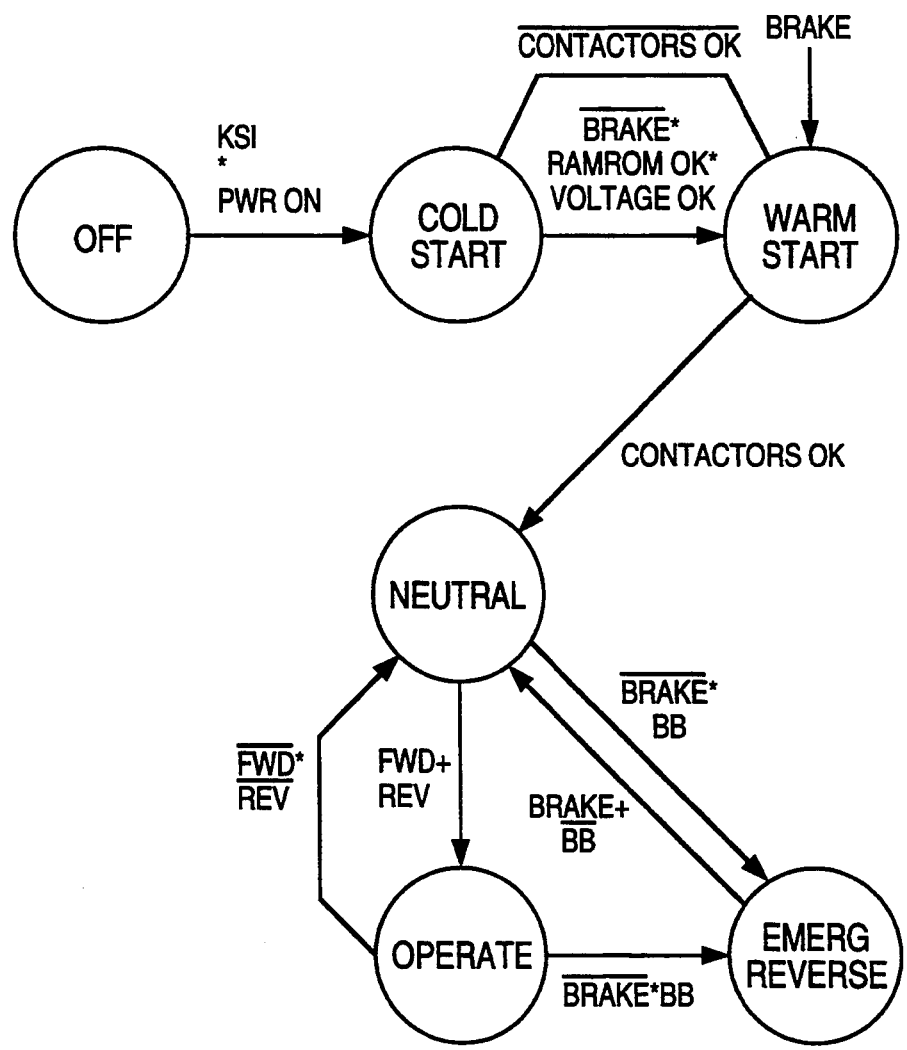
FIGS. 7 and 8 are state diagrams illustrating the operating modes of a motor controller in accordance with the present invention.
Figure 8:
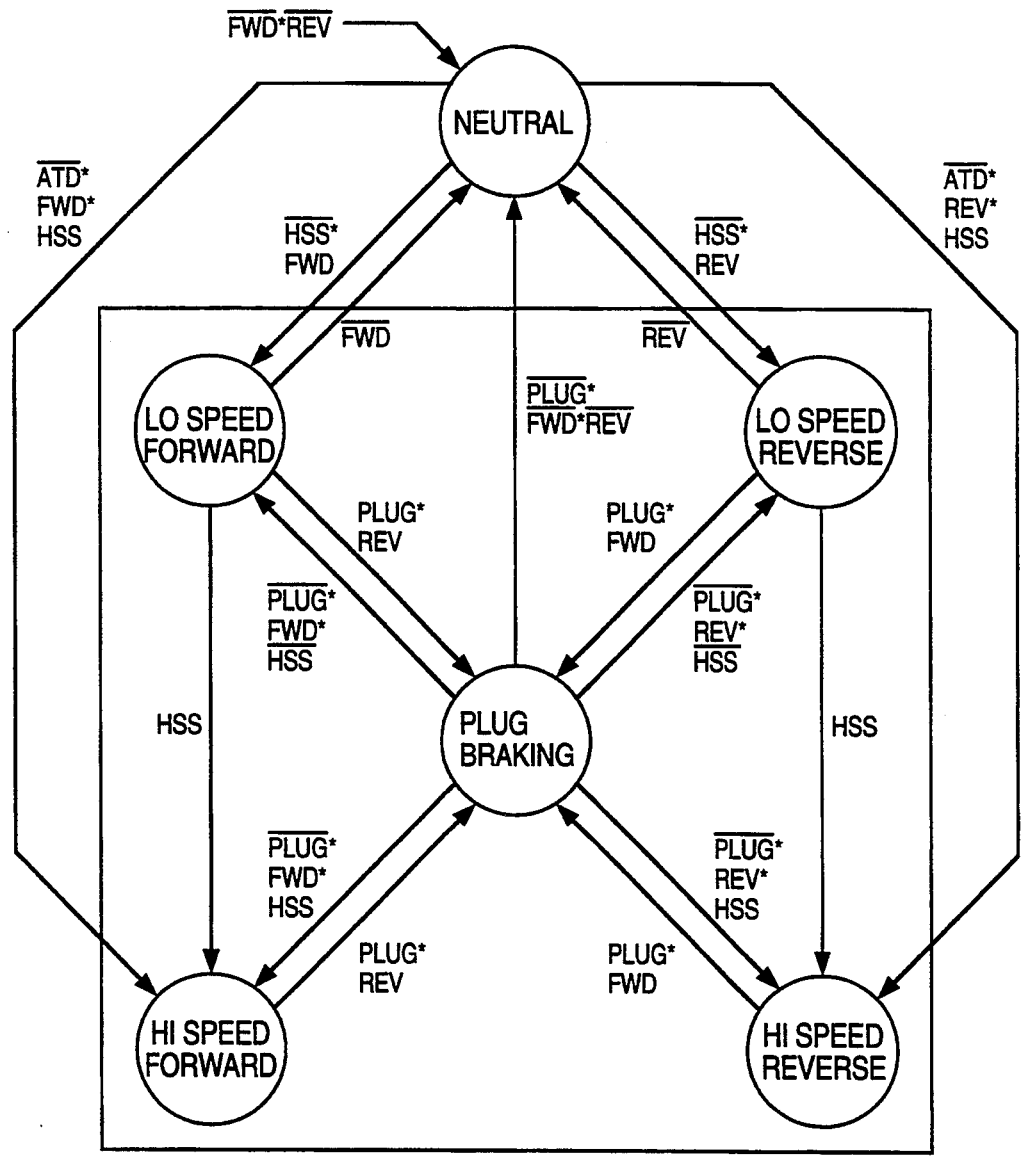

FIGS. 7 and 8 are state diagrams illustrating the operation of a motor controller in accordance with the present invention. As shown in FIG. 7, there are six basic operating modes: off mode, cold start mode, warm start mode, neutral mode, operate mode and emergency reverse mode. FIG. 8 illustrates the sub-modes within the operate mode. These state diagrams illustrate what steps an operator would have to take to get the controller to operate in a given mode. For example, to get the controller into the operate mode, the power must be turned on, the brake must be released, the hardware must pass a functional test, and the operator must select an action. Requirements such as these which cause the motor controller to change operating modes are indicated in the transition arrows between the various state bubbles.

Figure 9:
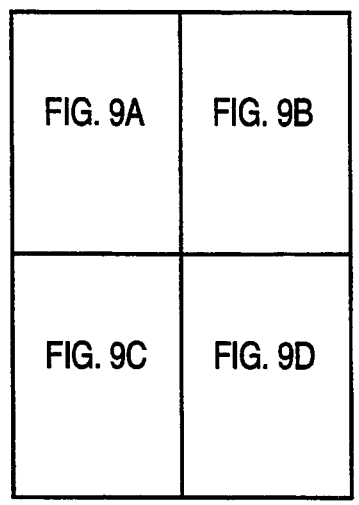
FIGS. 9-15 are flow charts illustrating software execution in a motor controller in accordance with the present invention.
Figure 9A:
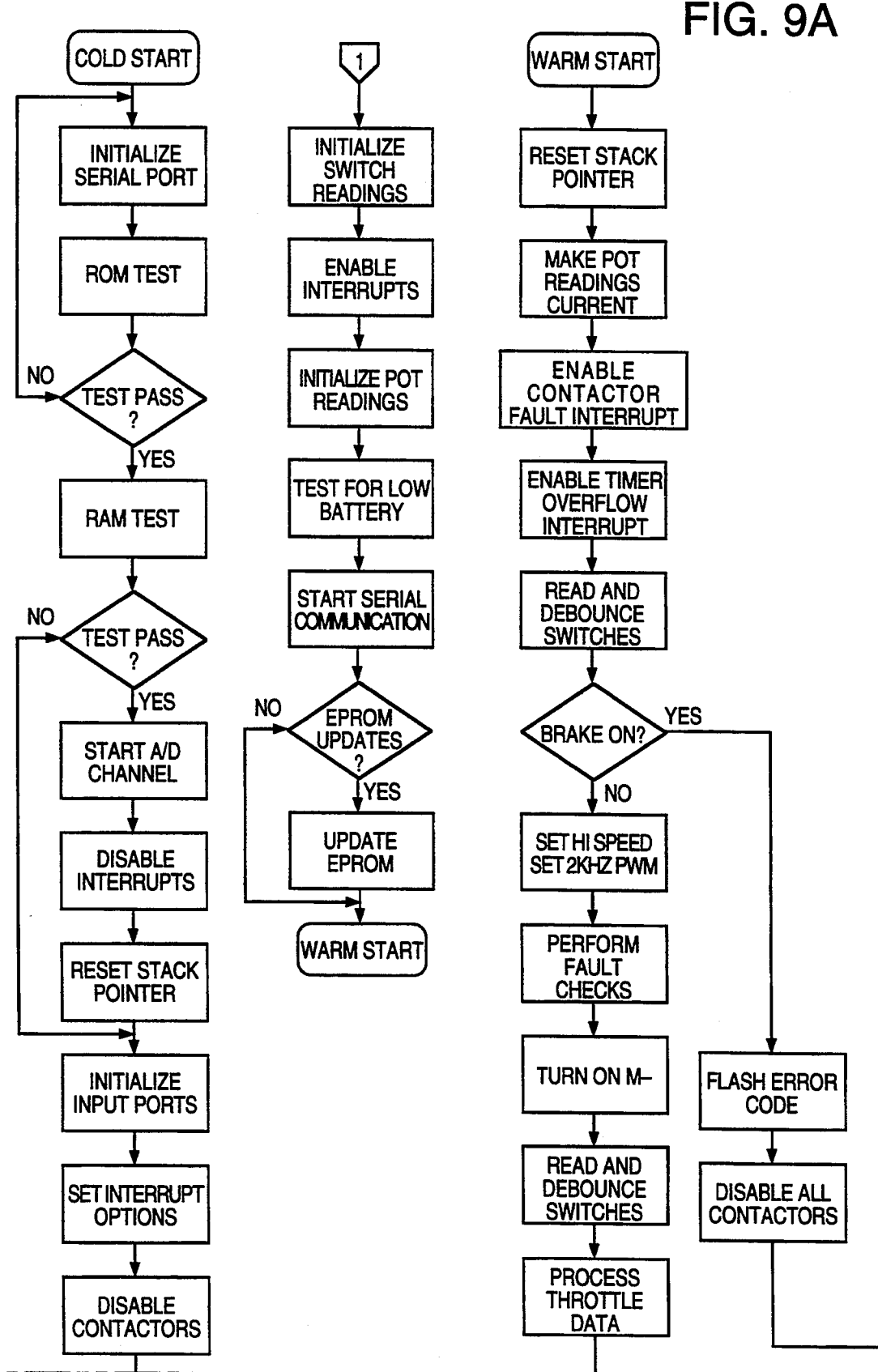
Figure 9B:
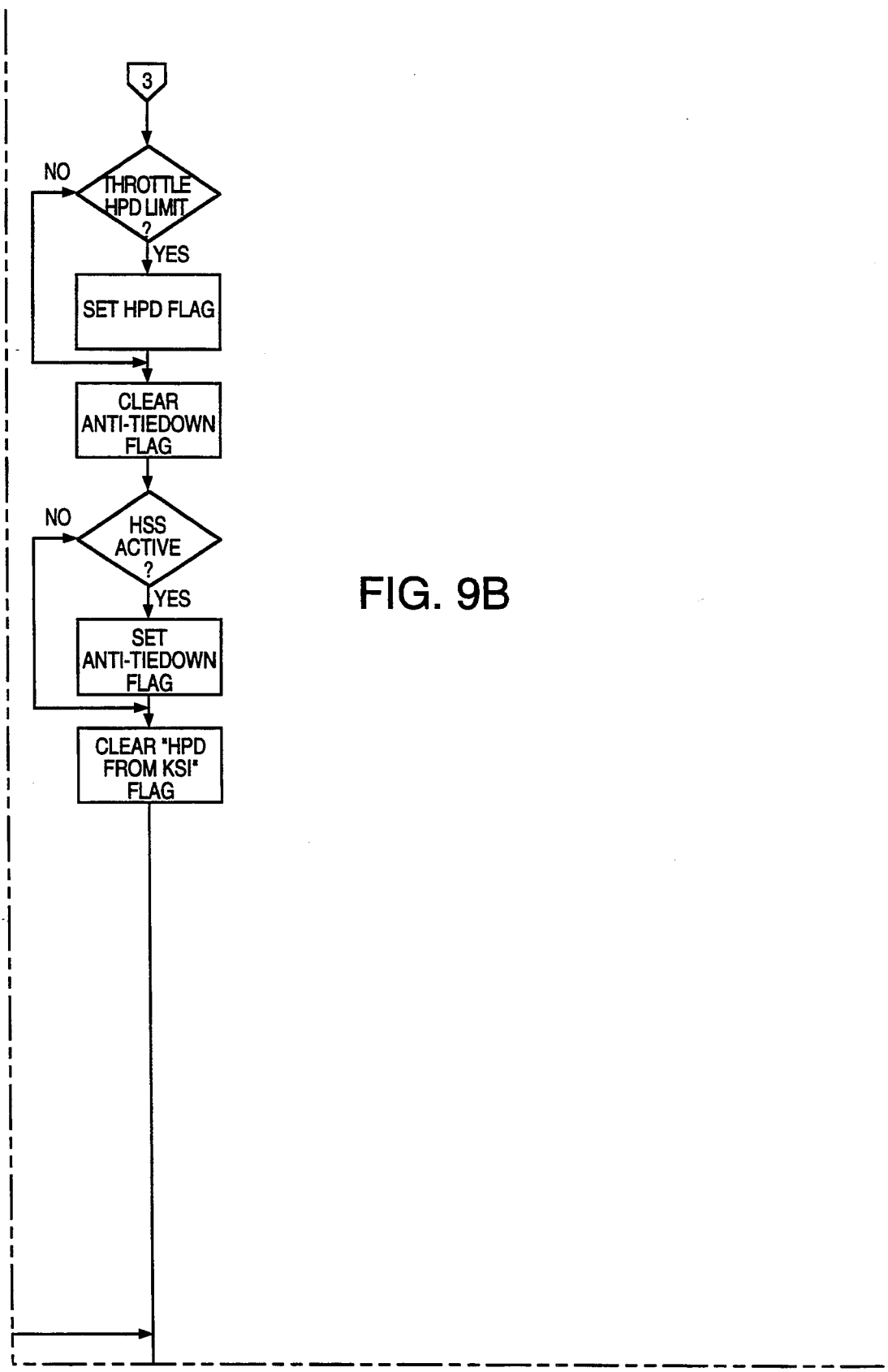
Figure 9C:
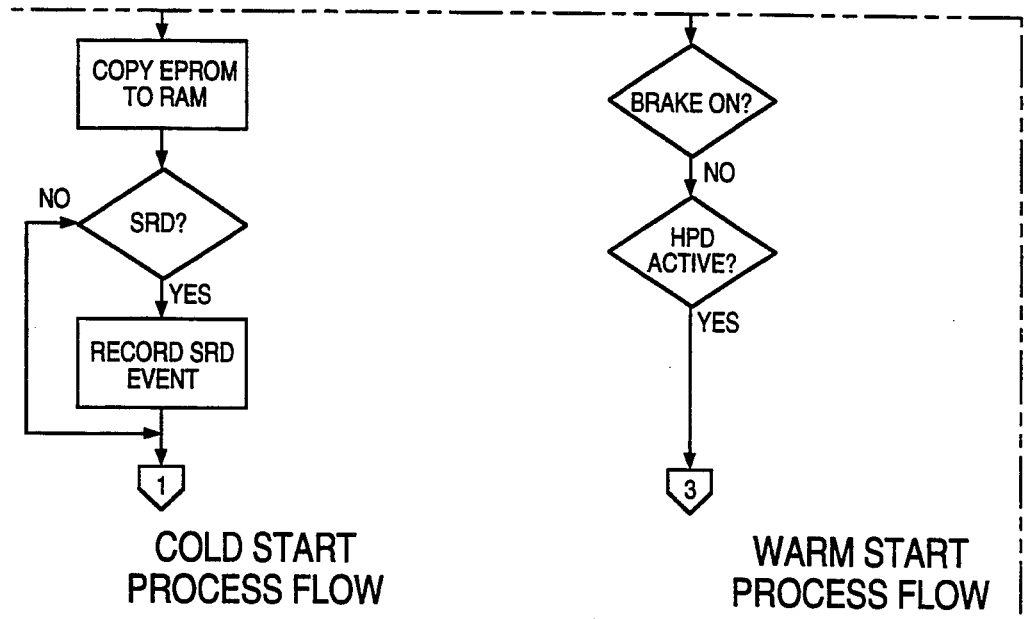
Figure 9D:
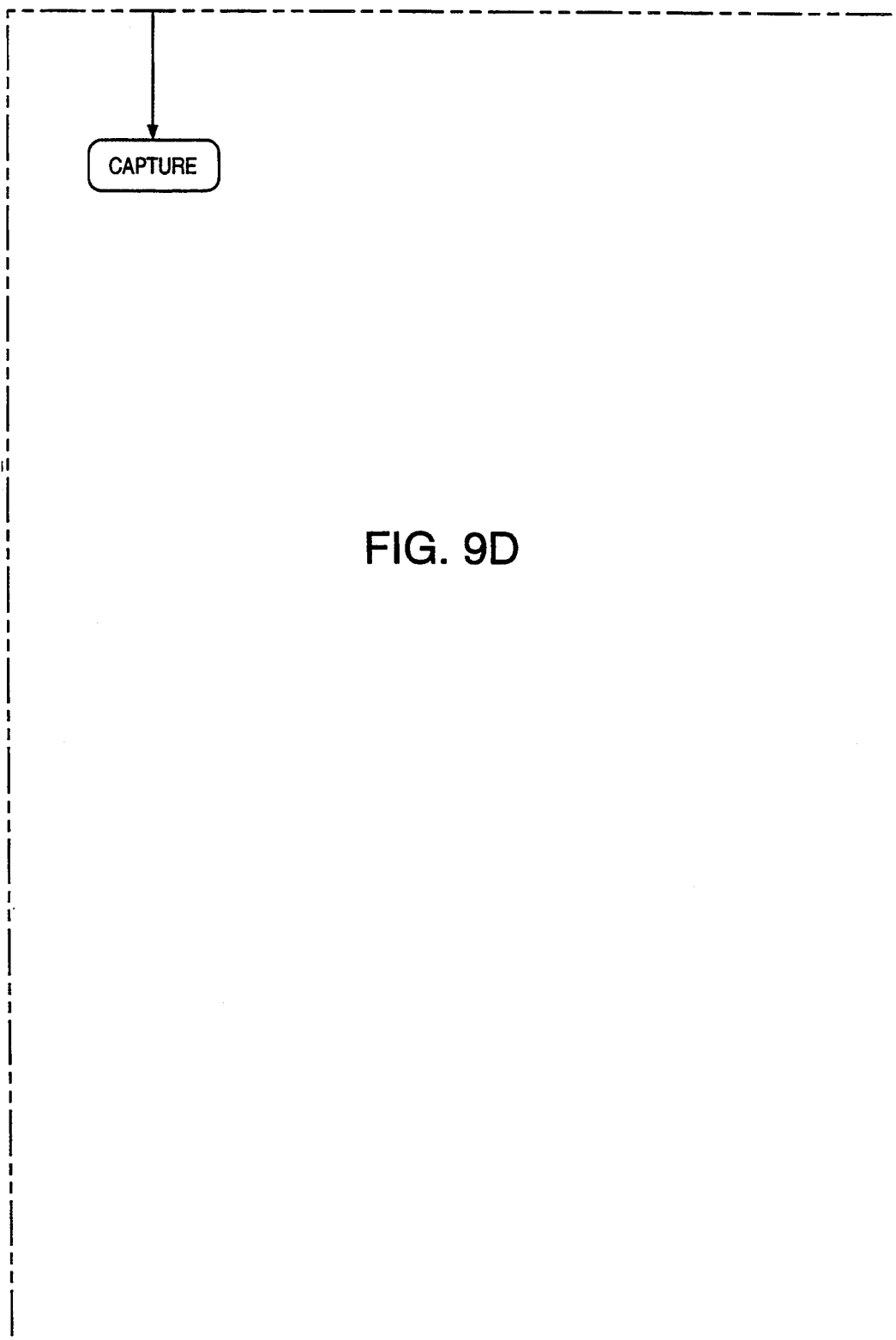
Figure 10:
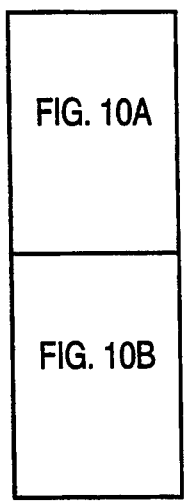
Figure 10A:
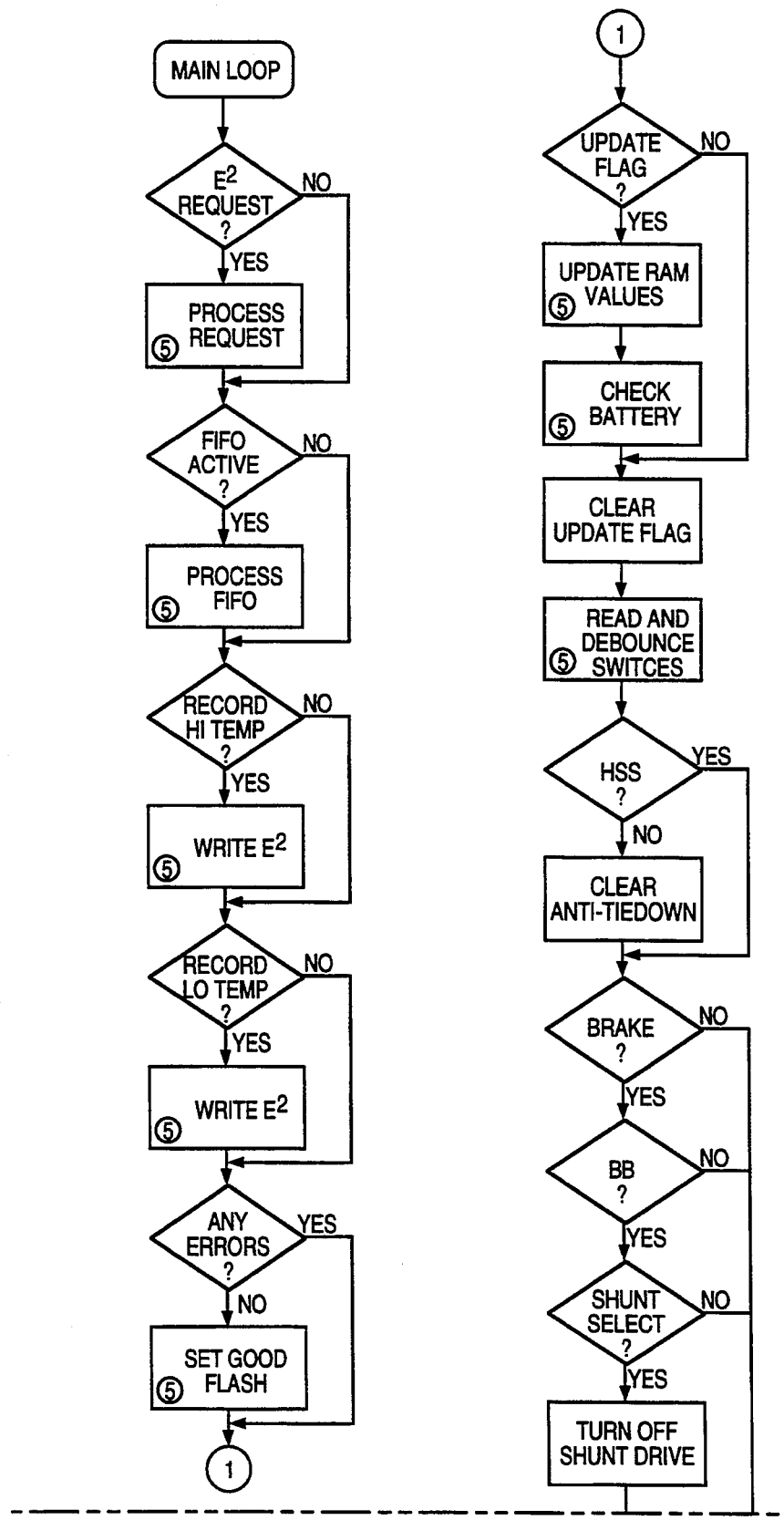
Figure 10B:
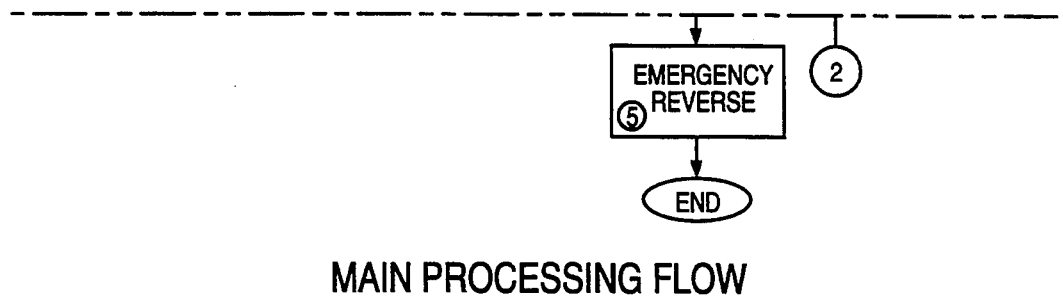
Figure 11:
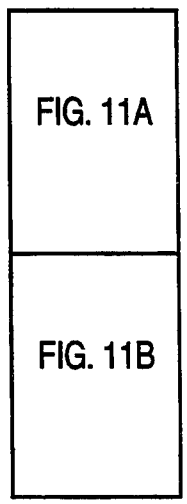
Figure 11A:
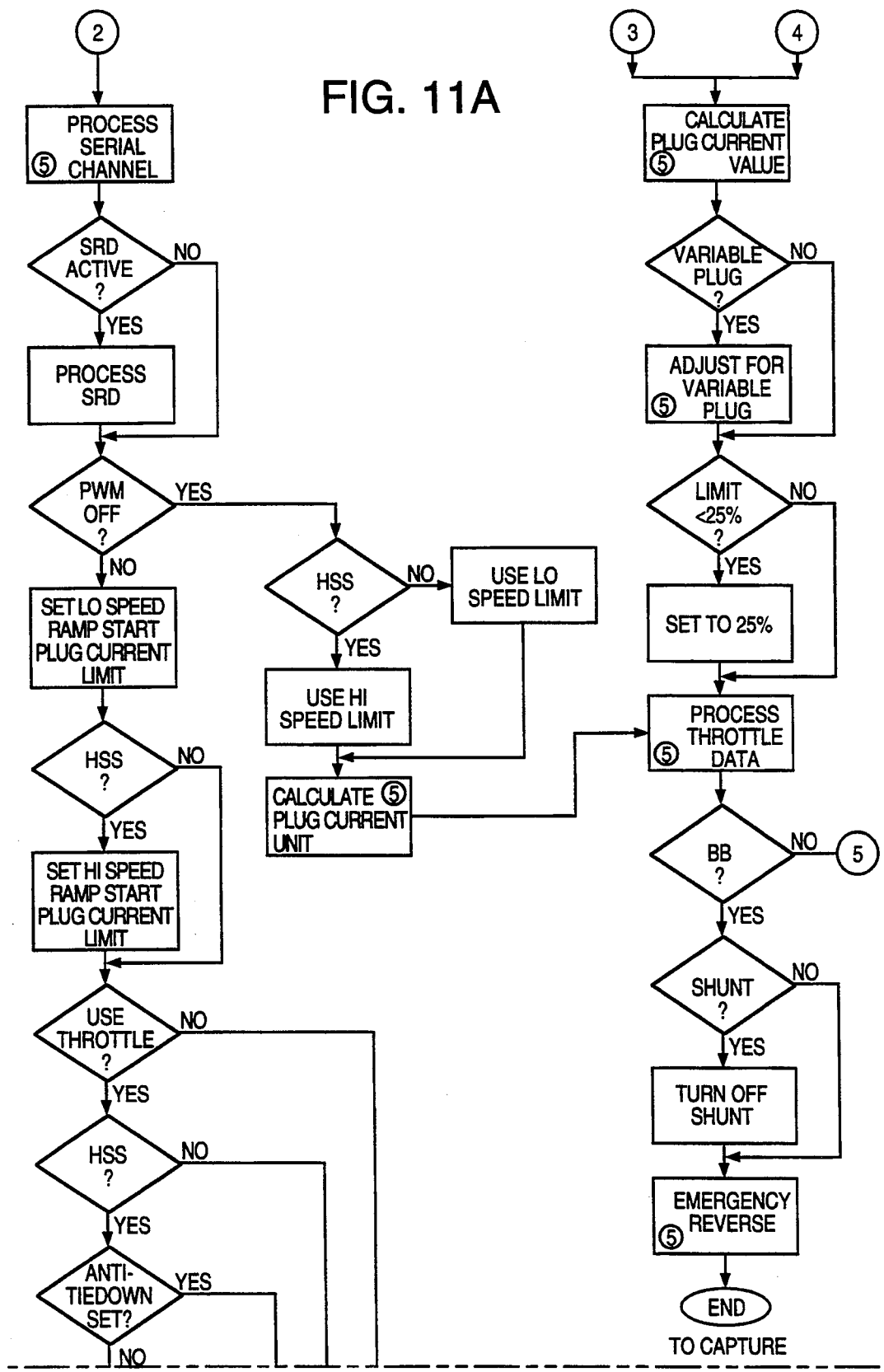
Figure 11B:
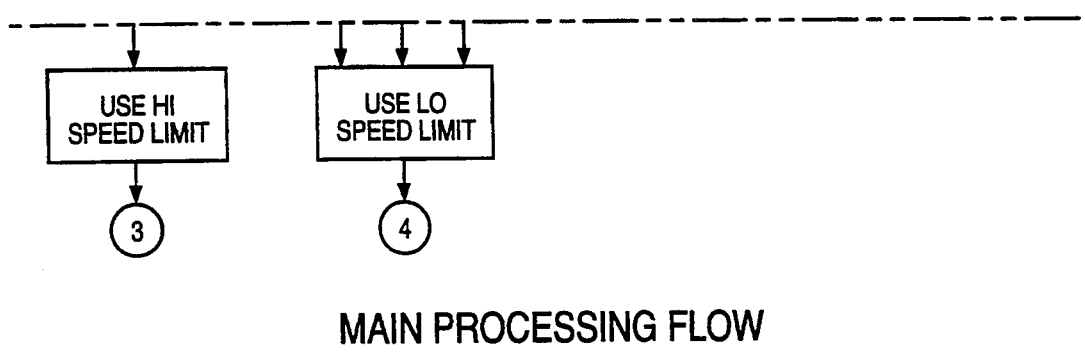
Figure 12:
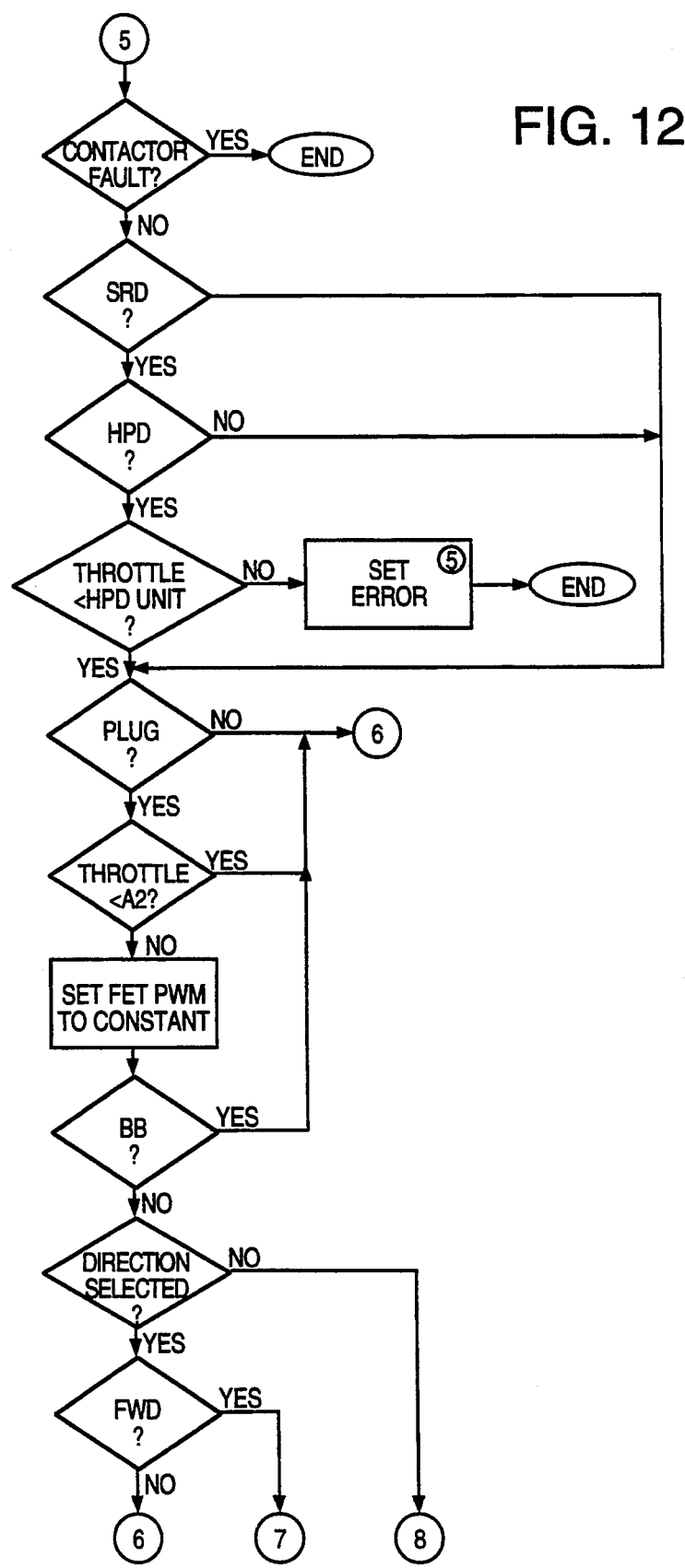
Figure 13:
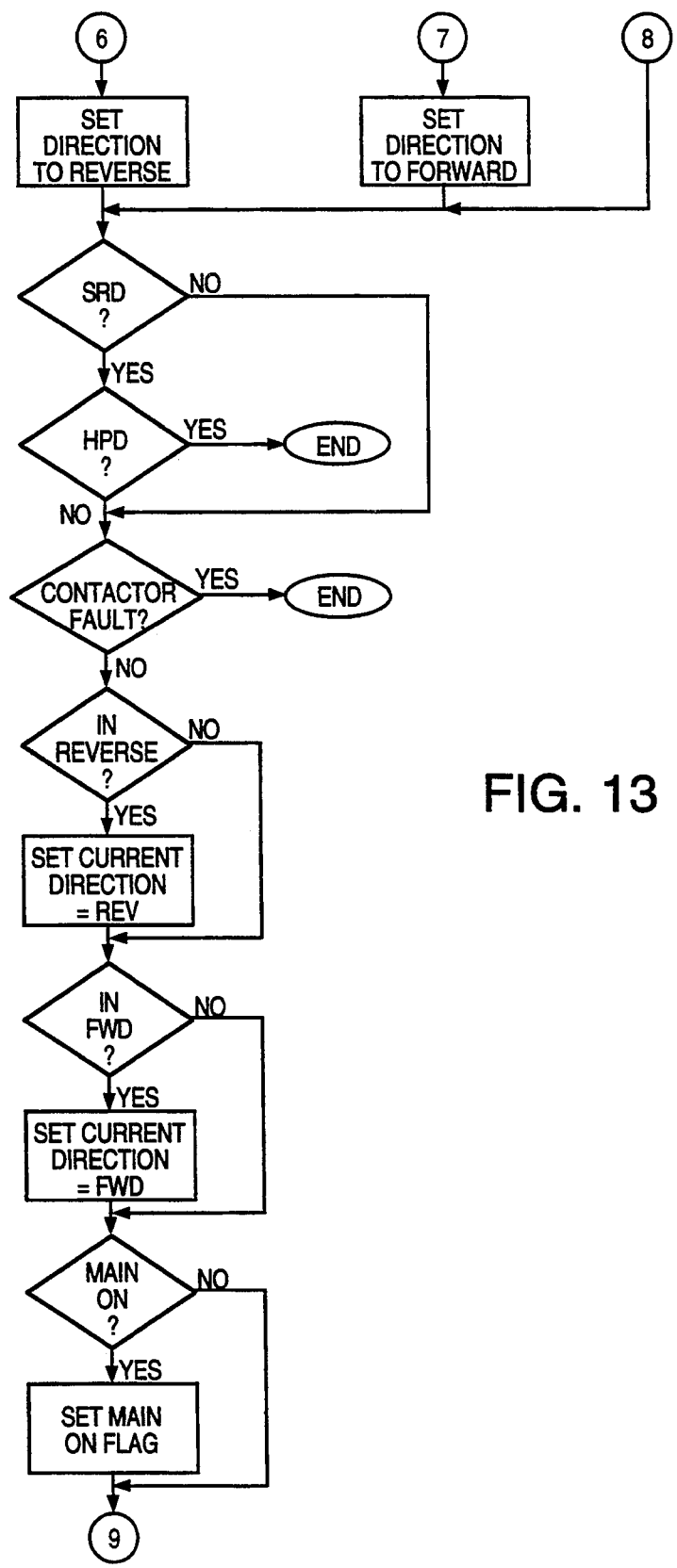
Figure 14:
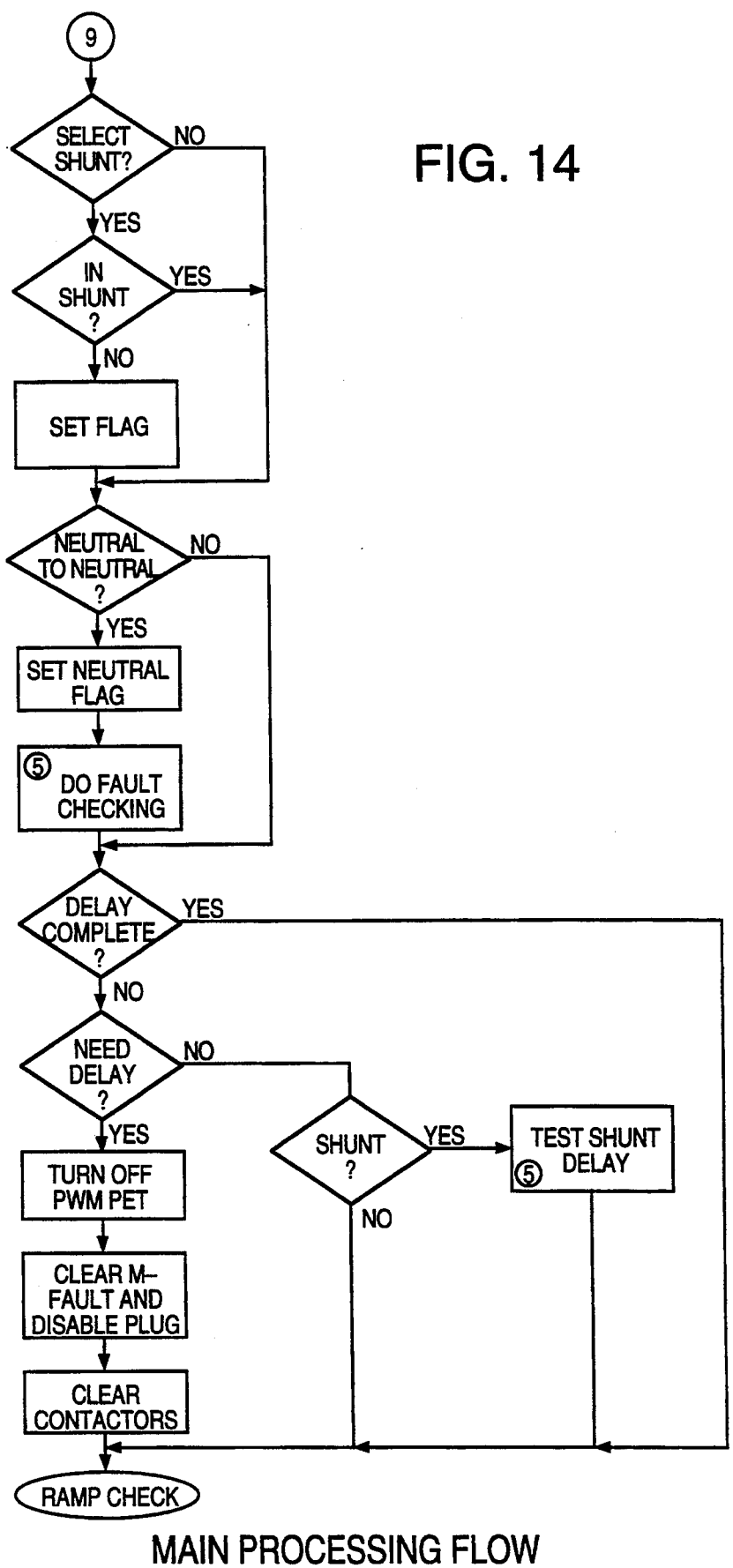
Figure 15:
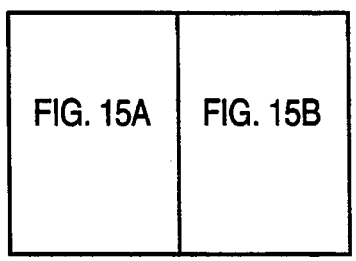
Figure 15A:
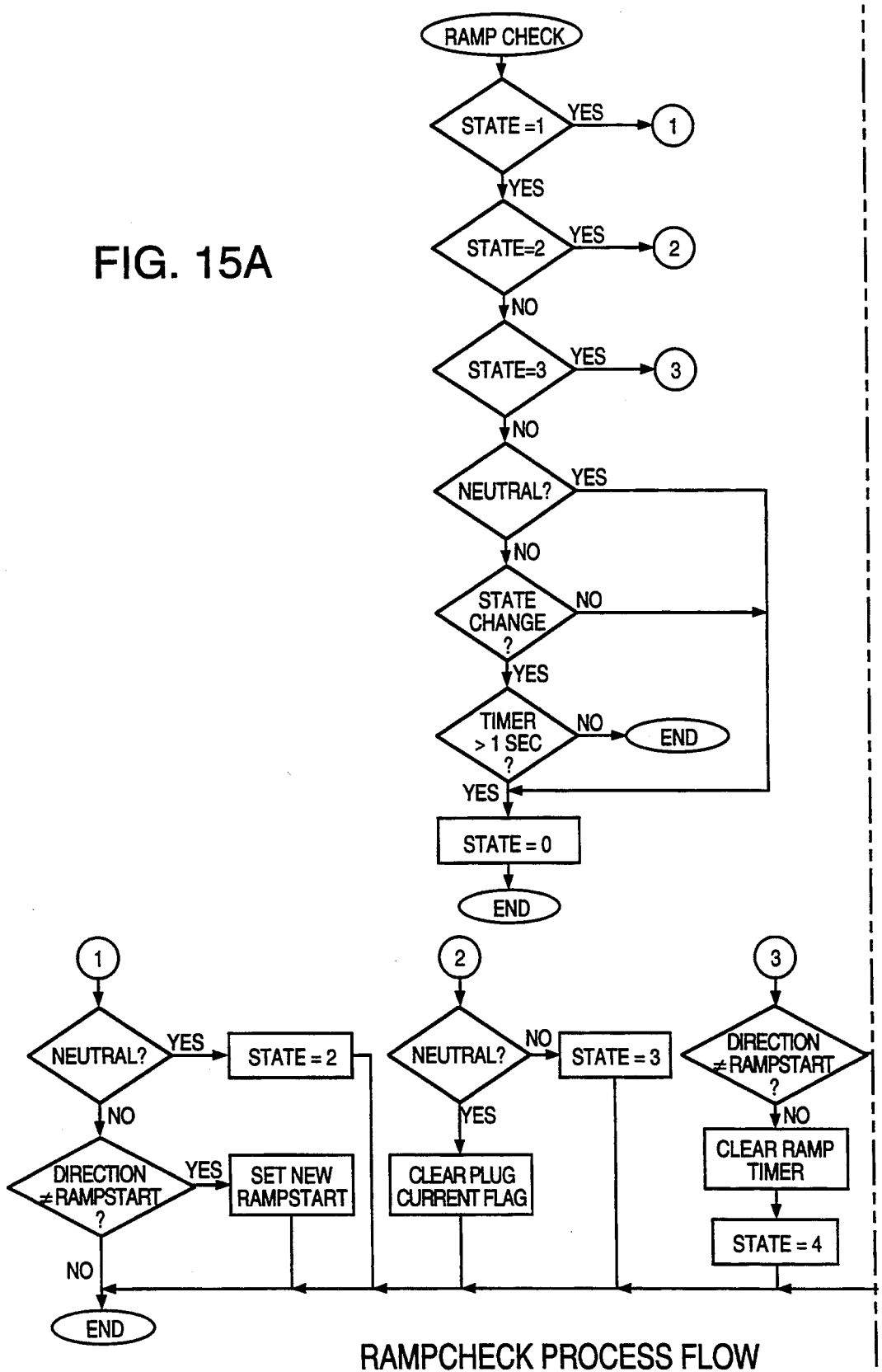
Figure 15B:
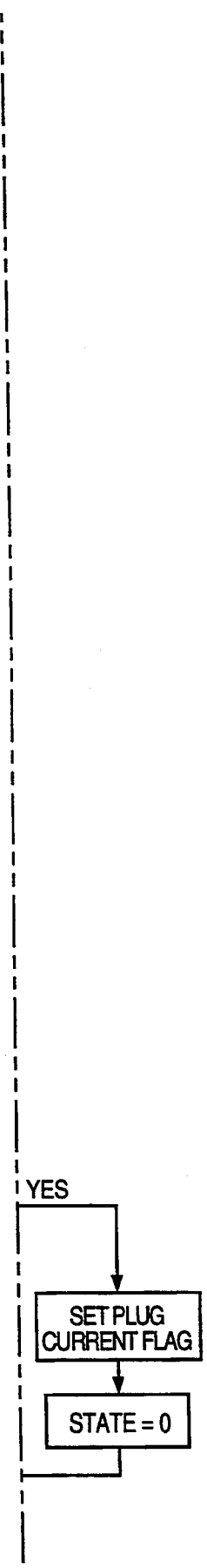

FIGS. 9 through 15 are flow charts illustrating software execution in a motor controller in accordance with the present invention. In contrast to the state diagrams of FIGS. 7 and 8, the flow charts of FIGS. 9-15 indicate what sequential steps the software takes when executing in the particular modes. FIG. 9 illustrates the process flow of both the cold start and the warm start modes of FIG. 7. FIGS. 10-14 illustrate the process flow of the main loop of the software executing in the operate and reverse modes of FIG. 7. The ramp check process illustrated in FIG. 15 is shown separately to make the ramp check executed at the end of the main loop easily identifiable in the flow charts.

Although the present invention has been described by way of the presently preferred embodiment, the invention is not limited thereto. Certain adaptations and modifications may be practiced without departing from the spirit and scope of the invention. Various features of the motor controller may be combined in different combinations in accordance with the present invention to adapt the motor controller to different applications. The above description of the preferred embodiment is therefore presented merely for illustrative instructional purposes and is not intended to limit the scope of the invention as set forth in the appended claims.

We claim:

1. A motor controller, comprising:
   a plug diode;
   a power switch which is conductive during a first period of a pulse width modulated plug braking cycle and is nonconductive during a second period of said pulse width modulated plug braking cycle, said first period having a beginning and an ending; and
   a circuit which tests at a predetermined time in said first period a voltage indicative of a voltage drop across said plug diode, said predetermined time being temporally disposed substantially near said ending of said first period.

2. The motor controller of claim 1, wherein said predetermined time is approximately one microsecond before said ending of said first period.

3. The motor controller of claim 1, wherein said circuit has a node, a voltage on said node transitioning if said plug diode is forward biased at said predetermined time, said voltage on said node not transitioning if said plug diode is not forward biased at said predetermined time, said node being coupled to an edge sensitive input lead of a digital processor.

4. The motor controller of claim 1, wherein said power switch receives a control signal on a control lead of said power switch, said predetermined time substantially coinciding with a transition of said control signal.

5. The motor controller of claim 4, wherein said circuit comprises a first input lead and a second input lead, said first input lead of said circuit being coupled to said control lead of said power switch, said second input lead of said circuit being coupled to a lead of said plug diode.

6. The motor controller of claim 5, wherein said circuit comprises:
   a capacitor having a first lead and a second lead, said first lead of said capacitor being said first input lead of said circuit;
   a first transistor having a first control lead, a second lead, and a third lead, said first control lead of said first transistor being coupled to said second lead of said capacitor;
   a second transistor having a first control lead, a second lead, and a third lead, said first control lead of said second transistor being coupled to said second input lead of said circuit; and
   a digital processor, said digital processor being coupled to said third lead of said first transistor and to said second lead of said second transistor.

7. The motor controller of claim 6, wherein said first control lead of said second transistor is coupled to said second input lead of said circuit via a voltage divider, said third lead of said first transistor being coupled to said second lead of said second transistor via a resistor, said second lead of said first transistor being coupled to a first DC voltage, said third lead of said second transistor being coupled to a second DC voltage, an edge sensitive input terminal of said digital processor being coupled to said third lead of said first transistor and to said second lead of said second transistor, said power switch comprising a field effect transistor.

8. A motor controller, comprising:
   a plug diode;
   a power switch which is conductive during a first period of a pulse width modulated plug braking cycle and is nonconductive during a second period of the pulse width modulated plug braking cycle; and
   a circuit which detects substantially continuous plug diode conduction throughout said first period, wherein said substantially continuous plug diode conduction throughout said first period is plug diode conduction throughout all but approximately one microsecond of said first period, said first period having a beginning and an ending, said circuit detecting said substantially continuous plug diode conduction throughout said first period at least in part by detecting a voltage on said plug diode during a time period, said time period being temporally disposed within approximately one microsecond of said ending of said first period.

9. A motor controller, comprising:
   a plug diode;
   a power switch which is conductive during a first period of a pulse width modulated plug braking cycle and is nonconductive during a second period of the pulse width modulated plug braking cycle; and a circuit which detects substantially continuous plug diode conduction throughout said first period, wherein said first period has a beginning and an ending, said circuit comprising:

means for testing a voltage on said plug diode during a time period, said time period being temporally disposed within approximately one microsecond of said ending of said first period.

10. A method comprising the steps of:

detecting when, in relation to a series of pulse width modulated power switch conduction cycles, a plug diode ceases to conduct plug current throughout substantially an entire conductive period of one power switch conduction cycle, each power switch conduction cycle having a conductive period when said power switch is conductive and having a nonconductive period when said power switch is nonconductive; and controlling said power switch based at least in part on when with respect to said series of pulse width modulated power switch conduction cycles said plug diode is detected to have ceased to conduct plug current throughout substantially an entire conductive period as detected in said detecting step.

11. The method of claim 10, further comprising the steps of:

driving a first terminal of a motor controller with a first DC voltage with a first current limit;

driving a second terminal of said motor controller with a second DC voltage with a second current limit; and detecting a voltage on said second terminal.

12. A motor controller, comprising:

a plug diode;

means for switching current, said means for switching being conductive during a first period of a pulse width modulated plug braking cycle and being nonconductive during a second period of said pulse width modulated plug braking cycle, said first period having a beginning and an ending; and means for testing at a predetermined time in said first period a voltage indicative of a voltage drop across said plug diode, said predetermined time being temporally disposed substantially near said ending of said first period.

13. The motor controller of claim 12, further comprising:

a first driving circuit connected to a first terminal of said motor controller, said first driving circuit outputting a first DC voltage with a first current limit;

a second driving circuit connected to a second terminal of said motor controller, said second driving circuit outputting a second DC voltage with a second current limit; and a circuit detecting a voltage on said second terminal.

14. A motor controller, comprising:

a plug diode;

a power switch which is conductive during a first period of a pulse width modulated plug braking cycle and is nonconductive during a second period of said pulse width modulated plug braking cycle, said first period having a beginning and an ending;

a microcontroller; and means, coupled to said microcontroller and receiving a timing signal, for outputting a signal to said microcontroller indicative of when both said plug diode is forward biased and said timing signal is present, said timing signal being indicative of a time within said first period which is substantially near said ending of said first period.

* * * * *